United States Patent [19]

Ogawa et al.

[11] Patent Number: 5,437,894
[45] Date of Patent: Aug. 1, 1995

[54] METHOD OF MANUFACTURING A WATER- AND OIL-REPELLING FILM HAVING SURFACE IRREGULARITIES

[75] Inventors: Kazufumi Ogawa; Mamoru Soga, both of Osaka, Japan

[73] Assignee: Matsushita Electric Industrial Co., Ltd., Osaka, Japan

[21] Appl. No.: 186,117

[22] Filed: Jan. 25, 1994

Related U.S. Application Data

[62] Division of Ser. No. 824,287, Jan. 23, 1992, Pat. No. 5,324,566.

[30] Foreign Application Priority Data

| Jan. 23, 1991 | [JP] | Japan | 3-024023 |
| Jan. 23, 1991 | [JP] | Japan | 3-024024 |
| Feb. 5, 1991 | [JP] | Japan | 3-036773 |
| Feb. 5, 1991 | [JP] | Japan | 3-036775 |
| Feb. 6, 1991 | [JP] | Japan | 3-038133 |
| Jun. 4, 1991 | [JP] | Japan | 3-132737 |

[51] Int. Cl.$^6$ ............................................. B06D 3/06
[52] U.S. Cl. ................................. 427/535; 427/299; 427/307; 427/309; 427/322; 427/327; 427/352; 427/385.5; 427/387; 427/388.1; 427/389.7; 427/393.5; 427/536; 427/539
[58] Field of Search .............. 427/536, 539, 412.1, 427/419.2, 419.3, 419.5, 299, 307, 309, 322, 327, 352, 385.5, 387, 388.1, 389.7, 393.5, 535

[56] References Cited

U.S. PATENT DOCUMENTS

| 4,539,061 | 9/1985 | Sagiv | 156/278 |
| 4,842,917 | 6/1989 | Ohno et al. | 428/141 |
| 4,863,794 | 9/1989 | Fujii | 428/325 |
| 4,865,910 | 9/1989 | Inoguchi et al. | 428/268 |
| 5,011,727 | 4/1991 | Kido et al. | 428/141 |
| 5,011,963 | 4/1991 | Ogawa et al. | 556/485 |
| 5,013,471 | 5/1991 | Ogawa | 252/62.52 |
| 5,284,707 | 2/1994 | Ogawa et al. | 428/333 |

FOREIGN PATENT DOCUMENTS

| 0363924 | 10/1989 | European Pat. Off. |
| 0346074 | 12/1989 | European Pat. Off. |
| 0386784 | 3/1990 | European Pat. Off. |
| 0482613 | 4/1992 | European Pat. Off. |
| 0491251 | 6/1992 | European Pat. Off. |

OTHER PUBLICATIONS

World Patents Index Latest, Derwent Publications Ltd., London, GB; AN 86-065417 & JP-A-61 016 910 (Hitachi Cable KK), Jan. 24, 1986 (abstract).

Ogawa, K. et al; Studies of Molecular Alignments of Monolayers Deposited by a Chemical Adsorption Technique; 1991, 7, pp. 1473–1477, American Chemical Society.

*Primary Examiner*—Michael Lusignan
*Attorney, Agent, or Firm*—Fish & Richardson

[57] ABSTRACT

A water- and oil-repelling adsorbing film formed on a material having active hydrogen such as hydroxyl group, imino group and amino group at the surface. This film is a chemically adsorbed film having surface irregularities exceeding 10 nanometers. It is directly or indirectly covalently bonded to the material surface and includes a monomolecular film or a polymer film with the molecules thereof containing a fluorocarbon group and a —Si— bond. The surface irregularities which exceed the molecular level are at least either those formed on the material surface itself, those due to particles formed on the substrate surface or those due to particles present in the chemically adsorbed film.

14 Claims, 20 Drawing Sheets

METHOD OF MANUFACTURING A WATER- AND OIL-REPELLING FILM HAVING SURFACE IRREGULARITIES

This application is a division of Ser. No. 07/824,287, filed Jan. 23, 1992, now U.S. Pat. No. 5,324,566.

BACKGROUND OF THE INVENTION

The present invention relates to water- and oil-repelling adsorbed films which can be used on electric products, vehicles and industrial apparatus requiring such a film and a method of manufacturing the same.

The invention further relates to water- and oil-repelling, anti-contaminating glass, ceramic, metal and plastic products and a method of manufacturing such products.

DESCRIPTION OF THE PRIOR ART

Heat-, weather- and wear-resistant super-thin coating films are desired for electric products, vehicles, industrial apparatus, mirrors and glass lenses.

Hitherto, coatings which have been extensively used for water- and oil-repelling purposes, has been produced by the surface roughening of an Al substrate or the like by means of blasting, a wire brush or chemical etching, and then coating a primer followed by a fluorine enamel coating or like paint. The coatings can be prepared by suspending fine fluorocarbon base particles of polyethylenetetrafluoride in ethanol, followed by drying and baking (or fixing) at about 400° C. for about one hour to affix the fluorocarbon based polymer to the substrate surface.

However, while this method permits ready manufacture, the polymer is bonded to the substrate by a mere anchor effect, thus imposing limitations on the adhesion of the polymer to the substrate. In addition, since the coating film surface is baked at a high temperature of 400° C., it is flattened, and it was impossible to obtain a satisfactorily water- and oil-repelling surface. The method, therefore, was insufficient for electric products, vehicles, industrial apparatus and so forth requiring water- and oil-repelling coating films.

The water- and oil-repelling properties have also been required for glass, ceramic, metal and plastic products, typically such glass products as vehicle window glass and front glass, optical lenses, glass lenses and building window glass, such ceramic products as sanitary porcelain, table dishes and flower vases, such construction materials as door and window sashes, metal materials for building exterior walls and such plastic products as furniture, cover films, decoration boards and panels.

Further, it has been a sole way of preventing contamination of the glass, ceramic, metal and plastic products to make the surface of the products as smooth as possible. It is a known practice to coat hydrophilic polymer for preventing the fogging of the glass surface. However, this provides only a tentative effect. It is also a known practice to coat a metal surface with a fluorine resin or the like. This is done by thinly coating a fluorine enamel and then baking the same. As another means of resin coating, a paint is dissolved or suspended in a solvent, and the suspension or solution is coated, followed by drying of the solvent and hardening by baking.

With the above method of fluorine resin coating, however, the obtained surface has irregularities on the order of several tens of microns, and therefore it is difficult to obtain a surface having excellent luster. In addition, the coating has inferior adhesion to the substrate, and high durability can not be obtained. Further, other resin coatings are inferior in adhesion strength, posing problems in durability. This is due to the fact that adhesion to the substrate is based on physical adsorption.

To solve the above problems inherent in the prior art, the present invention has an object of providing a coating film, which has strong adhesion to the substrate, is free from pin holes, has desirable surface irregularities and is excellently water- and oil-repelling and durable.

Another object of the invention is to provide a method of producing a fluorine-based monomolecular film, which has satisfactory adhesion to the substrate, is free from pin holes, has desirable surface irregularities and is excellently water- and oil-repelling for improving the performance of products requiring heat-, weather- and wear-resistant water-and oil-repelling coatings such as buildings, electric products, vehicles and industrial apparatus.

SUMMARY OF THE INVENTION

An objective of the invention is to provide a water- and oil-repelling adsorbing film formed on a substrate surface, the adsorbing film being a chemically adsorbed film having surface irregularities exceeding 10 nanometers, the chemically adsorbed film being bonded by covalent bonds to the substrate surface either directly or indirectly, and the chemically adsorbed film being a monomolecular or polymer film with the molecules thereof containing a fluorocarbon group and a siloxane group.

It is preferable in this invention that the surface irregularities are from irregularities formed on the substrate surface itself, irregularities due to fine particles formed on the substrate surface or irregularities due to fine particles present in the chemically adsorbed film.

It is preferable in this invention that the particles formed on the substrate surface and fine particles in the chemically adsorbed film are hydrophilic particles.

It is preferable in this invention that the hydrophilic particles and the polymer with the molecule thereof containing a fluorocarbon group and a siloxane group are bonded to one another by covalent bonds.

It is preferable in this invention that the surface irregular chemically adsorbed film is bonded by covalent bonds of —SiO— or —SiN= to the substrate surface.

It is preferable in this invention that comprises a thin layer of polysiloxane or a thin layer of chemically adsorbed monomolecular layer of siloxane formed on the substrate surface and a surface irregular film formed on the thin layer or the chemically adsorbed monomolecular layer.

It is preferable in this invention that the substrate surface is provided with irregularities formed by particles and/or a coated layer incorporating silicate glass and having surface irregularities and a thin layer or a chemically adsorbed monomolecular layer with the molecules thereof containing a fluorocarbon group and a siloxane group, the surface irregular layer and the thin layer or chemically adsorbed monomolecular layer being bonded to each other by siloxane bonds.

It is preferable in this invention that the substrate is made of at least a member of a group consisting of glass, ceramics, metals, plastics, wood, stone and semiconductors.

It is preferable in this invention that the substrate surface is provided with irregularities at a level less than the wavelength of visible light, and which is a anti-contaminating.

It is preferable in this invention that the substrate is a plastic film.

It is preferable in this invention that the plastic film has a coarsened surface with surface irregularities at a level less than 0.3 micrometers.

Another objective of this invention is to provide a method of manufacturing a water- and oil-repelling adsorbing film comprising:

making a substrate surface irregular; and contacting the irregular surface with a non-aqueous solution containing an active surface material having a fluorocarbon group and a chlorosilane group or having a fluorocarbon group and an alkoxysilane group.

It is preferable in this invention wherein comprising at least the following steps A to D:

A. forming the substrate surface having surface active hydrogen groups with surface irregularities and/or then providing the substrate surface with active hydrogen groups;

B. contacting the substrate surface with a silane-based surface active material with the molecules thereof containing a silyl group at one end and a fluorocarbon group at the other end to adsorb the surface active material to the substrate surface by a dehydrochlorination reaction or a dealcoholation reaction;

C. forming an outer layer by reacting with water with or without previous removal of non-reacted surface active material by washing using a non-aqueous organic solution; and D. drying or thermally treating the substrate surface.

It is preferable in this invention wherein comprising at least the following steps a to f:

a. forming the substrate surface having active hydrogen groups with surface irregularities and/or then providing the substrate surface with active hydrogen groups;

b. contacting the substrate surface with a non-aqueous solution containing a surface active material with the molecules thereof having a plurality of chlorosilyl groups to adsorb the surface active material by a dehydrochlorination reaction;

c. forming an inner layer by reacting with water with or without previous removal of non-reacted surface active material by washing with a non-aqueous organic solution;

d. contacting the surface of the inner layer with a silane-based surface active material with the molecule thereof containing a silyl group at one end and a fluorocarbon group at the other end to adsorb the surface active material to the substrate surface by a dehydrochlorination reaction or a dealcoholation reaction;

e. forming an outer layer by reacting with water with or without previous removal of non-reacted surface active material by washing with a non-aqueous organic solution; and f. drying or thermally treating the substrate surface.

It is preferable in this invention that the substrate surface is provided or formed with irregularities by:

mixing fine particles and silicate glass on the substrate surface and then thermally baking the coating together with the substrate, electrolytic etching, chemical etching, sand blasting, spattering, depositing, or rubbing..

It is preferable in this invention that the chlorosilyl-based surface active material is one with the molecules thereof having at one end a chlorosilane group represented by a formula;

$$—SiCl_nX_{3-n}$$

where n represents an integer from 1 to 3, and X represents at least one functional group selected from the group consisting of a lower-alkyl group and a lower-alkoxyl group.

It is preferable in this invention that the silane-based surface active material is a compound selected from a group consisting of $$CF_3—(CF_2)_n—T—SiY_pCl_{3-p}$$

where n represents an integer from 1 to 25, T represents a member of the group consisting of an alkyl group, an ethylene group, an acetylene group and a substituted group containing a silicon atom and a hydrogen atom, Y represents a substituted group selected from the group consisting of an alkyl group, a cycloalkyl group, an aryl group and derivatives of these groups, and p represents a number selected from the group consisting of 0, 1 and 2, and $$CF_3—(CF_2)_n—T'—SiZ_q(OA)_{3-q}$$

where n represents either 0 or an integer, T' represents a member of the group consisting of an alkyl group, an alkylene group, an alkyne group, and a substituted group containing a silicon atom and a hydrogen atom, Z represents a substituted group selected from a group consisting of an alkyl group, a cycloalkyl group, an aryl group and derivatives thereof A represents a hydrogen atom or an alkyl group, and q represents 0, 1 or 2.

It is preferable in this invention that the surface active material with the molecules thereof containing a plurality of chlorosilyl groups is a compound selected from the group consisting of $SiCl_4$, $SiHCl_3$, $SiH_2Cl_2$, and $Cl—(SiCl_2O)_n—SiCl_3$, where n is an integer from 1 to 10.

It is preferable in this invention that the substrate having hydroxyl groups at the surface is a plastic substrate with the surface thereof treated in an oxygen-containing plasma atmosphere to be hydrophilic.

It is preferable in this invention that the active hydrogen group on the substrate surface is a member of the group consisting of a hydroxyl group, an amino group and an imino group.

It is preferable in this invention that the non-aqueous solution containing a chlorosilyl-based surface active material contains a crosslinking agent selected from the group consisting of $SiP_sCl_{4-s}$ where P represents H, a lower-alkyl group and a lower-alkoxyl group, and s represents of 0, 1 and 2, and $SiQ_t(OA)_{4-t}$ where Q is at least one substituted group selected from the group consisting of a lower-alkyl group and a lower-alkoxyl group, A represents hydrogen atom or a lower-alkyl group, and t represents 0, 1 or 2.

Another objective of this invention is to provide a method of manufacturing a water- and oil-repelling adsorbing film comprising:

preparing a substrate having active hydrogen groups at the surface and contacting the substrate with a non-aqueous solution containing a material with the molecules thereof having a plurality of chlorosilyl groups to coat the material onto the surface of the substrate through a reaction between active hydrogen groups at the substrate surface and the chlorosilyl groups of the material with the molecules thereof having a plurality of chlorosilyl groups;

coating with a non-aqueous solution containing a mixture of the surface active material with the molecules thereof containing a fluorocarbon group and a chlorosilane group and fine particles having a hydrophilic surface;

contacting with a mixture of a material with the molecules thereof containing a fluorocarbon group and an alkoxysilane group and fine particles having hydrophilic surface; and thermally baking the coating together with the substrate.

Another objective of this invention is to provide a method of manufacturing a water- and oil-repelling adsorbing film comprising:

a step of preparing a substrate having active hydrogen groups at the surface and contacting the surface of the substrate with a non-aqueous solution containing a material with the molecules thereof containing a plurality of chlorosilyl groups to adsorb the material to the substrate surface through a reaction between active hydrogen groups on the substrate surface and chlorosilyl groups of the material with the molecules thereof having a plurality of chlorosilyl groups;

forming a thin film or a chemically adsorbed monomolecular film of the material with the molecules thereof containing a plurality of chlorosilyl groups on the substrate with or without removal of non-reacted material remaining on the substrate by washing with a non-aqueous organic solution;

adsorbing a non-aqueous solution containing a mixture of a surface active material with the molecules thereof having a fluorocarbon group and a silyl group and fine particles having hydrophilic surface; and thermally baking the coating together with the substrate.

DETAILED DESCRIPTION OF THE INVENTION

Figure 1:
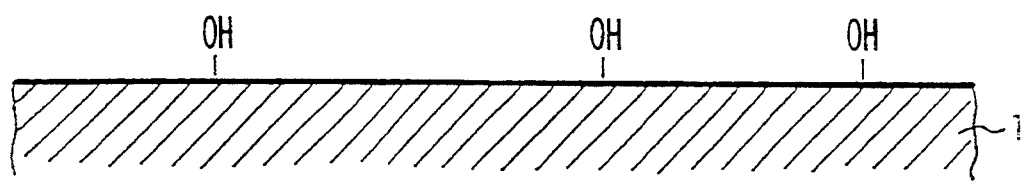
FIG. 1 is a schematic sectional view for explaining a process of manufacture as in example 1 of the invention.

A water- and oil-repelling adsorbing film formed on a material having active hydrogen such as hydroxyl group, imino group and amino group at the surface. This film is a chemically adsorbed film having surface irregularities exceeding 10 nanometers. It is directly or indirectly covalently bonded to the material surface and includes a monomolecular film or a polymer film with the molecules thereof containing a fluorocarbon group and a —Si— group. The surface irregularities which exceed the molecular level are at least either those formed on the material surface itself, those due to particles formed on the substrate surface or those due to particles present in the chemically adsorbed film.

According to the invention, an irregular thin surface film, which is either a coating film of a mixture of a polymer of a material having a fluorocarbon group and a chlorosilane group and hydrophilic, fine surface particles or a coating film of a mixture of a polymer with the molecules thereof containing a fluorocarbon group and a siloxane (—SiO—) group and hydrophilic, fine surface particles, is formed on a substrate surface such that it is chemically bonded thereto via a thin film of polysiloxane or a chemically adsorbed monomolecular film of siloxane. Thus, it is possible to obtain a coating film, which satisfactorily adheres to the substrate surface, is substantially pin-hole free has surface irregularities at the micron level and is excellent in water- and oil-repelling properties and durability.

In a method according to the invention, using a substrate having hydroxyl groups at the surface, a non-aqueous solution containing a material having a plurality of chlorosilyl groups is coated on the substrate to obtain a thin film having numerous —SiOH bonds on the substrate surface through a reaction between hydroxyl groups of the substrate surface and chlorosilyl groups in the material with the molecules thereof having a plurality of chlorosilyl groups. By subsequently coating with a non-aqueous solution containing a mixture of a material with the molecules thereof a fluorocarbon group and a chlorosilane group and hydrophilic, fine surface particles or with a solution containing a mixture of a material having a fluorocarbon group and an alkoxysilane group and hydrophilic, fine surface particles and then thermally baking (i.e., heating or curing) the coating together with the substrate in a moisture-containing atmosphere, a fluorocarbon-based coating film is chemically bonded by —SiO— bonds to the thin film having numerous —SiOH bonds formed in the preceding step on the substrate surface through a dehydrochlorination or dealcoholation reaction brought about between chlorosilane groups and alkoxysilane groups or between these groups and —SiOH groups of the thin film having numerous —SiO— bonds. The fluorocarbon-based coating film here is formed such that hydrophilic, fine surface particles are taken in by the afore-mentioned surface.

Meanwhile, in the step of coating with the non-aqueous solution containing the material with the molecule thereof having a plurality of chlorsilyl groups, subsequent to coating with the non-aqueous solution with the molecule thereof having a plurality of chlorosilyl groups for the reaction between hydroxyl groups of the substrate surface and chlorosilyl groups in the material with the molecules thereof having a plurality of chlorosilyl groups, by washing away excess material having a plurality of chlorosilyl groups remaining on the substrate by using a non-aqueous organic solution and then carrying out water washing, a polysiloxane-based chemically adsorbed monomolecular film with the molecules thereof having a plurality of silanol (—SiOH) groups can be formed on the substrate.

In this method, all the —SiOH bonds formed on the substrate surface are bonded to the substrate by siloxane bonds. Thus, by adsorbing the monomolecular film having the —SiO— bonds with a non-aqueous solution containing a mixture of a material with the molecules thereof having a fluorocarbon group and a chlorosilane group and hydrophilic surface fine particles or with a solution containing a mixture of a material having a fluorocarbon group and an alkoxysilane group and hydrophilic surface fine particles and thermally baking the coating together with the substrate in a moisture-containing atmosphere, a polymer containing a fluorocarbon group is chemically bonded via —SiO— bonds to the substrate through a dehydrochlorination reaction or dealcoholation reaction brought about between chlorosilane groups and alkoxysilane groups or between these groups and —OH groups of the polysiloxane-based monomolecular film having numerous —SiO— bonds formed in the preceding step in the substrate surface.

Thus, it is possible to produce a fluorocarbon-based adsorbing film with excellent adhesion and such that hydrophilic, fine surface particles are taken in by the aforementioned surface. If the thickness of the fluorocarbon-based adsorbing film is set at this time to be smaller than the diameter of the hydrophilic, fine surface particles, the aforementioned surface is naturally made irregular by the hydrophilic, fine surface particles. In addition, like the substrate surface the surfaces of the hydrophilic, fine surface particles are covered by the fluorocarbon-based adsorbing film. Thus, a florocarbon-based coating film can be formed, which is excellent in water- and oil-repelling properties and has desired surface irregularities.

The extent or level of the surface irregularities can be controlled according to the diameter and amount of the fine particles to be added. As the substrate having hydroxyl groups at the surface a metal or ceramic substrate may be used with the surface thereof covered by a natural oxide film. If a plastic or like substrate without any oxide film on the surface is to be used, its surface may be rendered hydrophilic in advance through treatment in an oxygen-containing plasma or corona atmosphere.

As the hydrophilic surface fine particles those of metals, ceramics, glass, stone, etc. may be used with the surface thereof covered by a natural oxide film. If plastic or like fine particles without any surface oxide film are to be used, their surface may be rendered to be hydrophilic in advance through a treatment in an oxygen-containing plasma or corona atmosphere.

Further, according to the invention a fluorine-containing chemically adsorbed monomolecular film is formed by siloxane bonds to the surface of a substrate after a surface toughening treatment thereof. It is thus possible to obtain a fluorine-based coating film, which is satisfactorily adhered to the substrate, is substantially pin-hole free, has desirable surface irregularities, has excellent water- and oil-repelling properties, is heat-resistant, weather-resistant, anti-contaminating, wear-resistant, etc.

Further, according to the invention by including a step of preliminarily forming a glass coating film having surface irregularities on the order of from sub-microns to microns on the surface of a fluorocarbon-based coating film by coating with a mixture of fine glass particles and silicate glass and baking the coating, or a step of coarsening the substrate by etching with a sand blast treatment, it is possible to provide the surface of a florocarbon-based coating film produced in a subsequent step with fine surface irregularities. Thus, it is possible to form a fluorocarbon-based coating film, which has desirable surface irregularities and excellent water- and oil-repelling properties.

The polymer containing a fluorocarbon group excellent adhesion for it is chemically bonded to the substrate by —SiO— or —SiN= covalent bonds.

In the method of coating with fine particles, the extent of surface irregularities can be controlled according to the diameter and amount of fine particles to be added to the silicate glass.

Further, by inserting subsequent to the step of forming surface irregularities a step of contacting the substrate with a non-aqueous solution containing a material having a plurality of chlorosilyl groups to cause precipitation of the material with the molecule thereof containing a plurality of chlorosilyl groups on the substrate surface through a reaction brought about between hydroxyl groups of the substrate surface and chlorosilyl groups of the material and a step of removing excess material with the molecule thereof containing a plurality of chlorosilyl groups remaining on the substrate by washing with a non-aqueous organic solvent and then causing reaction with water, and carrying out a step of causing chemical adsorption to the substrate surface of a chlorosilane-based surface active material having a chlorosilane (—SiCl$_n$X$_{3-n}$, n represents from 1 to 3, X represents a functional group) group at one end and a straight chain fluorocarbon group at the other end, a chemically adsorbed monomolecular fluorocarbon film can be produced, which has a higher molecular adsorption density.

As the material with the molecule thereof containing a chlorocarbon group and a chlorosilane group may be used

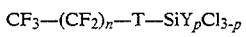
$CF_3—(CF_2)_n—T—SiY_pCl_{3-p}$ and as the material with the molecules thereof having a fluorocarbon group and an alkoxyl group may be used

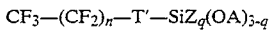
$CF_3—(CF_2)_n—T'—SiZ_q(OA)_{3-q}$

Further, for adjusting the hardness of the fluorocarbon-based polymer film, as the crosslinking agent may be use SiX$_s$Cl$_{4-s}$ where X represents a hydrogen atom or a substituted group such as an alkyl group and s represents 0, 1, or 2, or

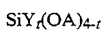
$SiY_t(OA)_{4-t}$ where A represents an alkyl group and t represents 0, 1, or 2. By so doing, the density of three-dimensional bridging in the produced fluorocarbon-based polymer film may be adjusted. That is, the hardness of the fluorocarbon-based polymer film having desirable surface irregularities can be controlled.

Further, the water- and oil-repelling coating film according to the invention comprises at least a layer of a mixture of fine particles and silicate glass having desirable surface irregularities and a polymer or chemically adsorbed monomolecular layer containing a fluorocarbon group and a siloxane group. Thus, it is possible to obtain a coating film, which is satisfactorily adhered to the substrate, is substantially pin-hole free, has surface irregularities measurable at the micron level and is excellent, in its water- and oil-repelling properties.

Further, by including in the method of manufacture according to the invention a step of producing a coating film having surface irregularities measurable at the micron level on the surface of a substrate for forming a fluorocarbon-based coating film or a chemically adsorbed monomolecular film by coating the surface with a mixture of fine glass particles and silicate glass, it is possible to provide a fluorocarbon-based coating film produced in a subsequent step with fine surface irregularities. Thus, it is possible to form a fluorocarbon-based polymer or chemically adsorbed monomolecular film, which has desirable surface irregularities and has excellent water-and oil-repelling properties. In this case, the polymer containing fluorocarbon groups are chemically bonded by —O— bonds to the substrate, and thus excellent adhesion can be obtained.

The extent or level of surface irregularities can be controlled according to the diameter and amount of fine particles added to silicate glass.

By so doing, the density of three-dimensional crosslinking in the fluorocarbon-based polymer film thus produced can be adjusted. That is, the hardness of the fluorocarbon-based polymer film having desirable surface irregularities can be controlled.

According to the invention, there is thus provided a method of manufacturing a coating film having desirable surface irregularities and excellent water- and oil-repelling properties comprising a step of coating the surface of a coating film substrate with a mixture of fine glass particles and silicate glass and thermally baking the coating together with the substrate, or a step of thinly coating with a non-aqueous solution containing a material having a fluorocarbon group and a chlorosilane group, or a step of coating with a solution containing a material having a fluorocarbon group and an alkoxysilane group to produce a polymer film.

Also, there is provided a method of manufacturing a water- and oil-repelling coating film having surface irregularities comprising a step of coating a desirable substrate surface with a mixture of fine glass particles and silicate glass to produce a glass coating film having desirable surface irregularities, a step of thermally baking the coating together with the substrate and a step of causing chemical adsorption to the substrate of a fluorocarbon silane-based surface active material containing a chlorosilane group at one end to form a monomolecular adsorbed film.

More specifically, according to the invention there is provided a water- and oil-repelling coating film, in which a fluorocarbon-based polymer film is formed via an irregular surface film of a mixture of fine particles and silicate glass, and which has desirable surface irregularities, and a method of manufacturing the same. Also provided is a water- and oil-repelling coating film, which comprises a coating layer of a mixture of fine glass particles and silicate glass and a chemically adsorbed monomolecular layer of a polymer material containing a fluorocarbon group and a chlorosilane group, and which has desirable surface irregularities, and a method of manufacturing the same.

The invention thus seeks to improve the performance of devices requiring heat-resistant, weather-resistant and wear-resistant coatings having excellent water- and oil-repelling properties. Such devices include electric products, vehicles and industrial apparatus.

Further, according to the invention a fluorine-containing chemically adsorbed monomolecular film is formed at least via siloxane bonds on the surface of a substrate having surface irregularities less than the wavelength of visible light. It is thus possible to obtain a water- and oil-repelling coating film, which is excellent in luster and has an excellent anti-contaminating effect such that contaminants will not attach without difficulty or will be readily removed if attached. That is, the film is a very thin chemically adsorbed monomolecular film, in which siloxane groups are chemically bonded to the substrate, the outer layer of which has a portion containing fluorine groups. Thus, excellent luster and anti-contaminating effects can be obtained.

According to the invention, the substrate is made of a member of a group consisting of glass, ceramics, metals, stone, and plastics, has excellent anti-contaminating effects. These properties can be provided to articles in which it has been previously difficult to provide anti-contaminating effects thereto.

In a further aspect, usual glass, ceramic, stone, or metal products have hydrophilic surfaces containing hydroxyl groups. According to the invention, there is provided a method of manufacture comprising a step of contacting a product with an aqueous solution containing molecules having a straight carbon chain having a chlorosilane at one end, e.g., a chlorosilane-based surface active material with the molecules thereof having a fluorocarbon group and a chlorosilane group, to precipitate of a monomolecular film of the material on the product surface through a reaction brought about between hydroxyl groups of the product surface and chlorosilyl groups of the material or contacting the product with a non-aqueous solution containing a material with the molecules thereof having a plurality of chlorosilyl groups to precipitate the material on the product surface through a reaction brought about between hydroxyl groups of the product surface and chlorosilyl groups of the material, a step of removing excess material with the molecules thereof having a plurality of chlorosilyl groups remaiming on the product surface by washing with a non-aqueous organic solution, thereby forming a siloxane-based monomolecular film of the material with the molecules thereof having a plurality of chlorosilyl groups on the substrate surface of the product, and a step of chemical adsorbing a silane-based surface active material with the molecules thereof containing a straight carbon fluoride chain having a chlorosilane group at one end to form a lamination chemically adsorbed monomolecular film. Thus, a lamination fluorocarbon chemically adsorbed monomolecular film may be formed on the product surface. In this case, by providing surface irregularities at a level less than the visible light wavelength (under about 400 nanometer (nm), preferably from 10 to 300 nm (0.01 to 0.3 micron)) without spoiling the intrinsic luster of the product. Thus, it is possible to provide a high performance product having high water- and oil-repelling effects.

Further, according to the invention on a coarsened film is formed a fluorine-containing chemically adsorbed monomolecular film via siloxane bonds. Thus, it is possible to obtain a water- and oil-repelling film, which includes a coating film having excellent water- and oil-repelling properties as well as heat-, weather- and wear-resistant properties.

Further, according to the invention, the coarsened film has surface irregularities at a level less than 0.3 microns. In addition an excellent light transmission property can be obtained, and the light transmission property of the film in the visible light range is not hindered.

Further, according to the invention, the material of the film is a poly(ethylene terephthalate) resin or a polyethylenetetrachloride resin. Thus materials which are suitable for cover films and protective films can be obtained.

The invention is applicable to various fields.

The invention can be widely applied to the following material surface. Materials made of metals, cermics or plastics, woods and stones etc. are applicable to the substrate. The surface of the substrate can also be coated with paints or the like.

Examples of cutlery: a kitchen knife, scissors, a knife, a cutter, a graner, a razor, hair clippers, a saw, a plane, a chisel, a gimlet, a badkin, a bite (cutting tools), the edge of a drill, the edge of a mixer and juicer, a blade of a mill, a blade of a lawnmower, a punch, a straw cutter, a staple of a stapler, a can opener or a surgical knife and the like.

Examples of needles: an acupuncture needle, a sewing needle, a matting needle, an injection needle, a surgical needle, a safety pin and the like.

Examples of products in the pottery industry: products made of a pottery, a glass, ceramics or enameled products. For example, such as sanitary pottery (a chamber pot, a wash-bowl, a bathtub etc.), tableware (a rice-bowl teacup, a dish (plate), a bowl, a teacup, a glass, a bottle, a coffee-pot (siphon), a pan, an earthenware mortar, a cup and (the like), vases (a flower bowl, a flowerpot, a bud vase and the like), water tanks (a breeding cistern, an aquarium water tank and the like), chemical experiment appliances (a beaker, a reactor vessel, a test tube, a flask, a laboratory dish, condenser, a mixing rod, stirrer, a mortar, a bat, a syringe etc.) a roof tile, enameled ware, an enameled washbowl, and an enameled pan and the like.

Examples of mirrors: a hand mirror, a full-length mirror, a bathroom mirror, a lavatory mirror, vehicle mirrors (a rear-view mirror, a side mirror, a door mirror etc.), half mirror, road mirrors such as a curve mirror, a show window glass, a salesroom in the department store, medical care mirrors, a concave mirror, a convex mirror and the like.

Examples of molding parts: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calender processing roll and the like.

Examples of ornaments: a watch, a jewel, a pearl, a sapphire, a ruby, an emerald, a garnet, a cat's eye, a diamond, a topaz, a bloodstone, an aquamarine, a turquoise, an agate, a marble, an amethyst, a cameo, an opal, a crystal, a glass, a ring, a bracelet, a brooch, a tiepin (a stickpin), an earring, a necklace, jewelry made of platinum, gold, silver, copper, aluminium, titanium, tin and those alloy, stainless steel, a glass frame and the like.

Examples of forming molds for food: cake, cookies, bread-baking, chocolate, jelly, ice cream, ovenware, ice trays and the like.

Examples of cookware: kitchen utensils (a pan and a pot), a kettle, a pot, a frying-pan, a hot plate, a toasting net, a takoyaki plate and the like.

Examples of papers: photogravure paper, hydrophobic and oilphobic paper, poster paper, high-grade pamphlet paper, wrapping paper, package paper, drinking package paper, container paper, printing paper, synthetic insulating paper and the like.

Examples of resin(s): a polyolefin such as a polypropylene and polyethylene, a polyvinylchloride plastic, a polyamide, a polyimide, a polyamideimide, a polyester, an aromatic polyester, a polycarbonate, a polystyrene, a polysulfide, a polysulfone, a polyethersulfone, a polyphenylenesulfide, a phenolic resin, a furan resin, a urea, an epoxy resin, a polyurethane, a silicon resin, an ABS resin, a methacrylic resin, an acrylate resin, a polyacetal, a polyphenylene oxide, a polymethylpentene, a melamine resin, an alkyd resin, an unsaturated polyester resin and the like.

Examples of rubber: styrene-butadiene rubber, butyl rubber, nitril rubber, chloroprene rubber, polyurethane rubber, silicon rubber and the like.

Examples of household electrical appliances: a television, a radio, a tape recorder, an audio device, a compact disc (CD) device, a refrigerator, a freezer, an air conditioner, a juicer, a mixer, a blade of an electric fan, a lighting apparatus, a dial plate, a dryer for perms and the like.

Examples of sports articles: skis, fishing rods, poles for pole vaulting, boats, yachts, surfboards, golf balls, bowling balls, fishing line, fishing nets, floats and the like.

The examples applying to vehicle parts:
(1) ABS resin: a lamp cover, an instrument panel, trimming parts, a protector for a motorcycle.
(2) Cellulose plastic: a car mark, a steering wheel
(3) FRP (fiber reinforced plastics): a bumper, an engine cover (jacket)
(4) Phenolic resin: a brake
(5) Polyacetal: wiper gear, a gas valve
(6) Polyamide: a radiator fan
(7) Polyarylate (polycondensation polymerization by bisphenol A and pseudo phtalic acid): a directional indicator lamp or lens, a cowl board lens, a relay case
(8) Polybutylene terephthlate (PBT): a rear end, a front fender
(9) Poly(amino-bismaleimide): engine parts, a gear box, a wheel, a suspension drive system
(10) Methacrylate resin: a lamp cover lens, a meter panel and its cover, center mark
(11) Polypropylene: a bumper
(12) Polyphenylene oxide: a radiator grill, a wheel cap
(13) polyurethane: a bumper, a fender, an instrument panel, a fan
(14) Unsaturated polyester resin: a body, a fuel, tank, a heater housing, a meter pannel.

Examples of office supplies: a fountain pen, a ballpoint pen, a propelling pencil (an automatic or a mechanical pencil), a pencil case, a binder, a desk, a chair, a bookshelf, a rack, a telephone stand table, a rule (measure), a drawing instrument and the like.

Examples of building materials: materials for a roof, an outer wall and interiors. Roof materials such as a brick, a slate and a tin (a galvanized iron sheet) and the like. Outer wall materials such as wood (including a processed manufactured wood), mortar, concrete, ceramics sizing, a metalic sizing, a brick, a stone, plastics and a metal such as aluminium. Interior materials such as a wood (including processed wood), a metal such as aluminium, plastics, paper, fiber and the like.

Examples of building stones: granite, marble and others used for such as a building, a building material, an architectural fixture, an ornament, a bath, a grave, a monument, a gatepost, a stone wall, a paving stone and the like.

Examples of musical instruments and sound apparatus: a percussion instrument, a stringed instrument, a keyboard instrument, a woodwind instrument, brass and others, and sound apparatus such as a microphone and a speaker. To be specific, there are musical instruments such as a drum, a cymbal, a violin, a cello, a guitar, a koto (harp), a piano, a flute, a clarinet, a bamboo flute and a horn, and sound apparatus such as a microphone, a speaker and an ear-phone and the like.

Examples of a thermos bottle, a vacuum bottle, a vacuum vessel and the like.

Examples of a highly resisiting voltage insulator such as a power supplying insulator or a spark plug, which are highly hydrophobic, oilphobic and aid in preventing contamination.

Now, examples of the invention will be given which are not to be constructed as limiting the invention in any way. Unless otherwise specified, % is by weight in the examples.

EXAMPLE 1

As shown in FIG. 1, a hydrophilic substrate 1 was prepared, the substrate being of such material as glass, ceramics or metals, e.g., Al and Cu. If a substrate made of a plastic or like material and having no surface oxide film is to be used, its surface may be preliminarily made hydrophilic. That is, hydroxyl groups may be introduced to its surface by treating the surface in an oxygen-containing plasma or corona treatment atmosphere at 100 W for 20 minutes. Then, the substrate surface may be coated with a solution containing 90% of normal hexadecane and 10% of chloroforms, the solution being prepared by dissolving, to a concentration of several %, a non-aqueous solution containing a mixture of a material with the molecules thereof containing a fluorocarbon group and a chlorosilane group such as $CF_3-(CF_2)_5(CH_2)_2SiCl_3$

Figure 2:
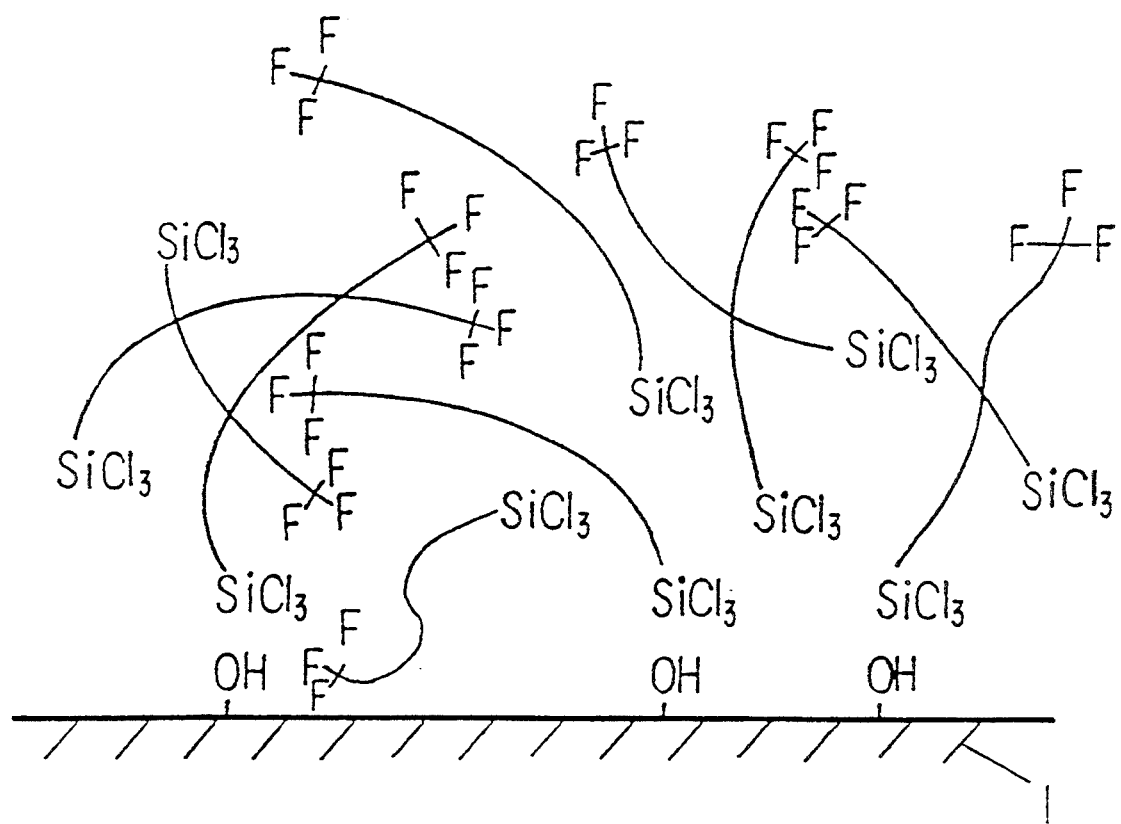
FIG. 2 is a sectional view, enlarged to a molecular level, showing the same.
Figure 3:
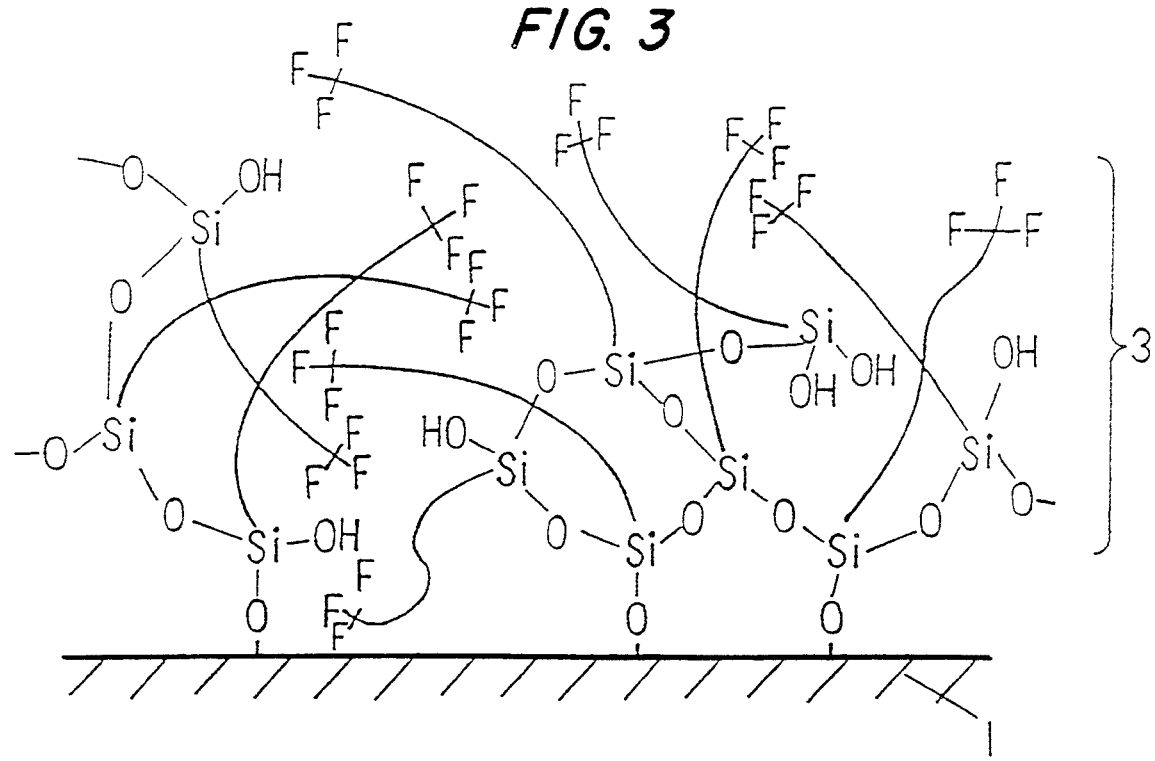
FIG. 3 is a sectional view, enlarged to a molecular level, showing the same, i.e., portion A in FIG. 4.

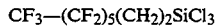

hydrophilic silica fine surface particles 2 with the molecules thereof containing an —OH group (FIG. 2). The coating was then baked in a moisture-containing atmosphere at 200° C. for about 30 minutes. Since the hydrophilic fine surface particles had —OH groups exposed on the surface, a hydrochloric acid removal reaction (dehydrochlorination reaction) was brought about between chlorosilyl groups of the fluorine-containing chlorosilane-based surface active material and —OH groups, thus producing —Si(O—)$_3$ bonds on the surface. A fluorine-containing siloxane fluorocarbon-based polymer film 3 thus was formed which was chemically bonded to the surfaces of the substrate and the fine particles (FIG. 3).

As another example, by dissolving or suspending $CF_3CH_2O(CH_2)_{15}SiCl_3$

to a concentration of 1% and hydrophilic fine surface silica particles with the molecule thereof containing an —OH group to a concentration of about 10%, a solution or suspension containing 80%, n-hexadecane and 12% of carbon tetrachloride and 8% of chloroform was obtained, which was then coated on the surface of the afore-mentioned substrate provided with a surface polysiloxane coating film having numerous —SiOH bonds and baked in a moisture-containing atmosphere at 200° C. for about 30 minutes, thus producing bonds of $CF_3CH_2O(CH_2)_{15}Si(O-)_3$

Figure 4:
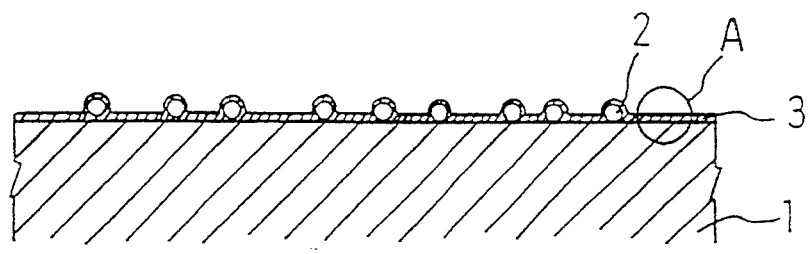
FIG. 4 is a schematic sectional view for explaining the coating film in the first example of the invention.

A fluorocarbon-based coating film 3 was thus obtained, which had surface irregularities of 0.5 to 50 microns (μm) meter, preferably 1 to 10 microns (μm), and a thickness of 1 to 5 microns (FIG. 4). FIG. 3 shows a portion A of FIG. 4 to an enlarged scale. This coating film did not separate in a checkerboard test.

Further, by adding SiX$_s$Cl$_{4-s}$ where X represents a hydrogen atom or a substitute group such as an alkyl group, and s represents 0, 1, or 2, for example by 3% by weight SiCl$_4$ as a crosslinking agent for the material with the molecules thereof containing a fluorocarbon group and a chlorosilane group, to the solution containing the material, the bonds of $CF_3CH_2O(CH_2)_{15}Si(O-)_3$

were crosslinked three-dimensionally via bonds of —Si(O—)$_3$. A fluorocarbon-based coating film was thus obtained, which had about double the hardness of a film obtained without addition of SiCl$_4$.

The fluorocarbon-based coating film was thus produced having surface irregularities of about 10 microns and a water wetting angle of about 130 to 140 degrees.

Although the above example used CF$_3$—(CF$_2$)$_5$(CH$_2$)SiCl$_3$, and CF$_3$CH$_2$O(CH$_2$)$_{15}$SiCl$_3$ as the crosslinking agents, if an ethylene group or acethylene group is added to or incorporated in the alkyl chain portion, crosslinking can be obtained by irradiating the coating film with an electron beam of about 5 Mrads. It is thus possible to readily obtain a coating film with the hardness increased by about ten times. In addition to the above fluorocarbon-based surface active material may be used $CF_3(CH_2)_2Si(CH_3)_2(CH_2)_{15}SiCl_3$,
$CF_3(CF_2)_3(CH_2)_2Si(CH_3)_2(CH_2)_9SiCl_3$, and
$CF_3COO(CH_2)_{15}SiCl_3$.

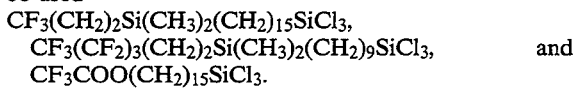

EXAMPLE 2

Figure 5:
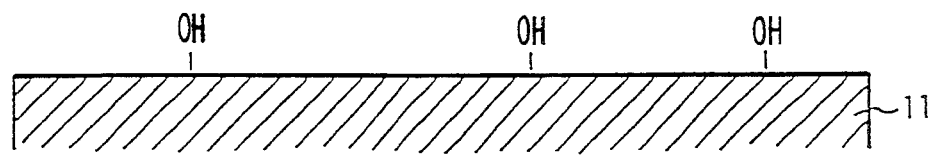
FIG. 5 is a schematic sectional view for explaining a process of manufacture as in example 2 of the invention.
Figure 6:
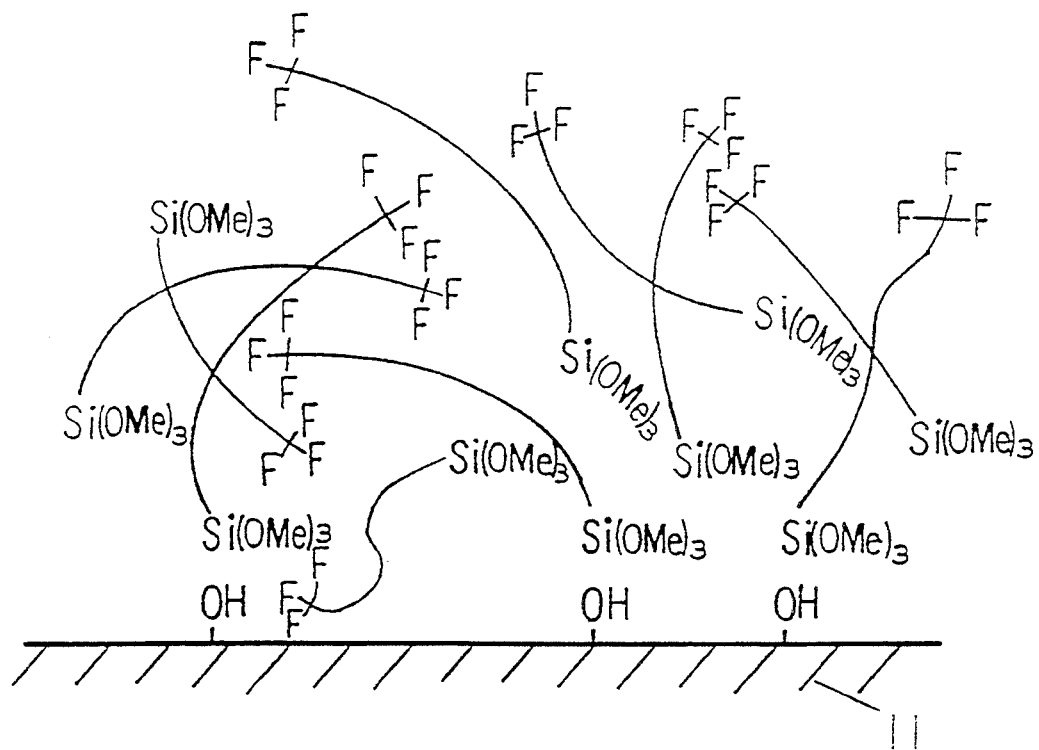
FIG. 6 is a sectional view, enlarged to a molecular level, showing the same.

As shown in FIG. 5, like Example 1, a hydrophilic substrate 11 was coated with an alcohol solution containing a material with the molecules thereof having a fluorcarbon group and an alkoxysilane group, for example $CF_3-(CF_2)_5(CH_2)_2Si(OC_2H_5)_3$

Figure 7:
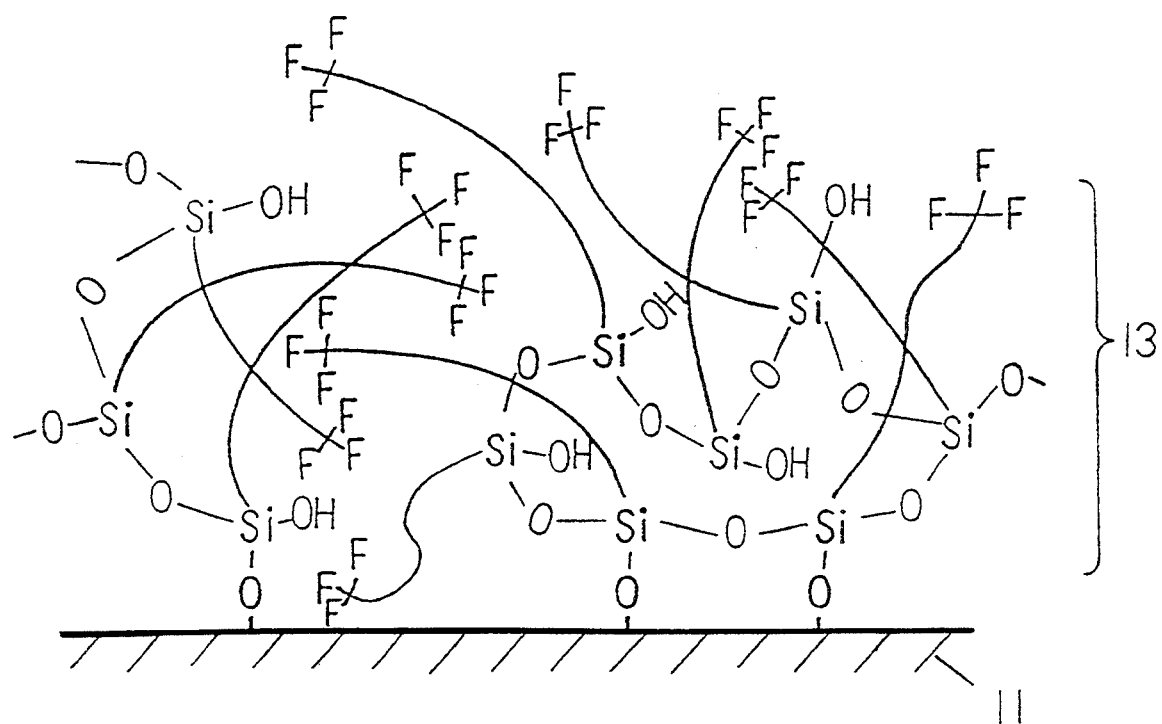
FIG. 7 is a sectional view, enlarged to a molecular level, showing the same, i.e., portion B in FIG. 8.

The coating was baked at 200° C. for about 30 minutes. Since the substrate 11 and hydrophilic surface fine particles 12 had —OH groups exposed on their surfaces, an alcohol removal reaction (dealcoholation reaction) was brought about between the alkoxy groups of the fluorine-containing alkoxysilane-based surface active material and -OH groups, thus producing —Si(O—)$_3$ bonds on the substrate surface. A fluorine-containing siloxane fluorocarbon-based polymer film 13 thus could be formed on the surface of the substrate and the fine particles which were chemically bonded to the substrate (FIG. 7).

As another an example, by dipping the substrate surface with an ethanol solution or suspension prepared by dissolving or suspending 1% of $CF_3CH_2O(CH_2)_{15}Si(OCH_3)_3$

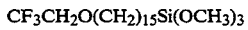

and about 10% of hydrophilic surface silica fine particles having a diameter of 0.5 to 50 microns, preferably 1 to 10 microns, and containing an —OH group and baking the coating at 200° C. for about 30 minutes, bonds of $CF_3CH_2O(CH_2)_{15}Si(O-)_3$

Figure 8:
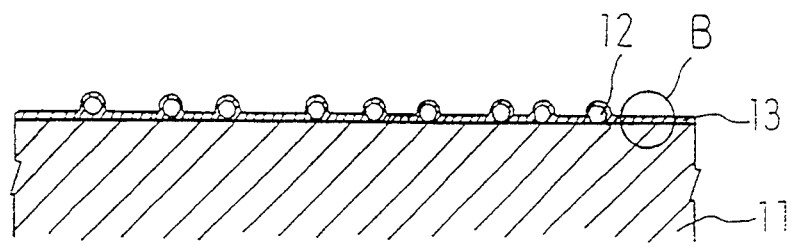
FIG. 8 is a schematic sectional view for explaining the coating film in the example 2 of the invention.

were produced. Thus, a fluorocarbon-based coating film 13 with surface irregularties of 0.5 to 50 microns, preferably 1 to 10 microns, and having a thickness of 1 to 5 microns could be produced (FIG. 8). FIG. 7 shows an enlarged scale of a portion B shown in FIG. 8. This coating film did not separate in a checkerboard test.

Further, by adding $Si(OCH_3)_4$ about 5% by weight as a crosslinking agent for the material having a fluorocarbon group and an alkoxysilane group to solution containing the material, the bonds of $CF_3CH_2O(CH_2)_{15}Si(O—)_3$ were crosslinked three-dimensionally via $—Si(O—)_3$ bonds. A fluorocarbon-based coating film was obtained, which had about 2 to 2.5 times the hardness of the film obtained without addition of $Si(OCH_3)_4$.

The fluorocarbon-based coating film was thus produced having surface irregularities of about 10 microns and a water contact angle of about 135 to 140 degrees.

Further, by adding 10% of $Si(OC_3H_7)_4$ as a crosslinking agent for the material containing a fluorocarbon group and an alkoxysilane group to the solution containing the material, a fluorocarbon-based coating film having about four times the hardness could be obtained.

Further by carrying out the coating with a non-aqueous solution containing the material having a fluorocarbon group and an alkoxysilane group, to which 20 wt.% of fine particles of a fluorocarbon-based polymer (i.e., polyethylene-tetrafluoride) was further dispersed, a fluorocarbon-based coating film could be obtained, which had excellent adhesion compared to the prior art although the hardness was comparable to the prior art.

While the above example used $CF_3—(CF_2)_5(CH_2)Si(OC_2H_5)_3$ or
$CF_3CH_2O(CH_2)_{15}Si(OCH_3)_3$ as the crosslinking agent, by adding or incorporating an ethylene group or an acetylene group into the alkyl chain portion, the resulting coating film can be subjected to crosslinking with irradiation by an electron beam of about 5 Mrads. It is thus possible to obtain a coating film having about 10 times the hardness.

Further, as the fluorocarbon-based surface active material other than noted above could be utilized $CF_3(CH_2)_2Si(CH_3)_2(CH_2)_{15}Si(OCH_3)_3$,
$CF_3(CF_2)_3(CH_2)_2Si(CH_3)_2(CH_2)_9Si(OCH_3)_3$, and $CF_3COO(CH_2)_{15}Si(OC_2H_5)_3$ etc.

EXAMPLE 3

Figure 9:
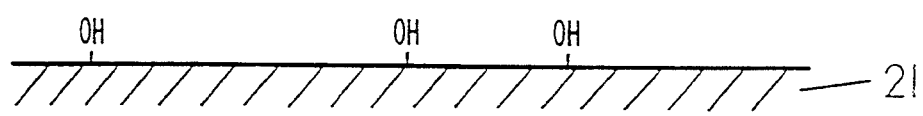
FIG. 9 is a schematic view, enlarged to a molecular level, showing a substrate prior to the process as in example 3 of the invention.

As shown in FIG. 9, a hydrophilic substrate 21 was prepared, the substrate being of such material as glass, ceramics or metals, e.g., Al and Cu. If a substrate made of a plastic or like material and having no surface oxide film is to be used, its surface may be preliminarily made hydrophilic. That is, hydroxyl groups were introduced to its surface, by tearing the surface in an oxygen-containing plasma atmosphere at 100 W for 20 minutes. Then, the substrate surface was coated with a non-aqueous solution containing a material containing a plurality of chlorosilyl groups (e.g., $SiCl_4$, $SiHCl_3$, $SiH_2Cl_2$, and $Cl(SiCl_2O)_2SiCl_3$ (n represents an integer), particularly $Cl(SiCl_2O)_2SiCl_3$ greatly effective for making the surface hydrophilic, the solution being prepared by dissolving, for instance, 1% by weight of the material in chloroform solvent.

As an example, by using $Cl(SiCl_2O)_2SiCl_3$ as the material containing a plurality of chlorosilyl groups, since the surface of the substrate 21 contained hydrophilic —OH groups, a dehydrochlorination reaction was brought about on the surface, and molecules represented by formula [1]:

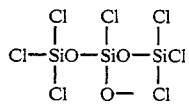

Formula [1]

were formed by —SiO— bonds to the substrate surface.

Figure 10:
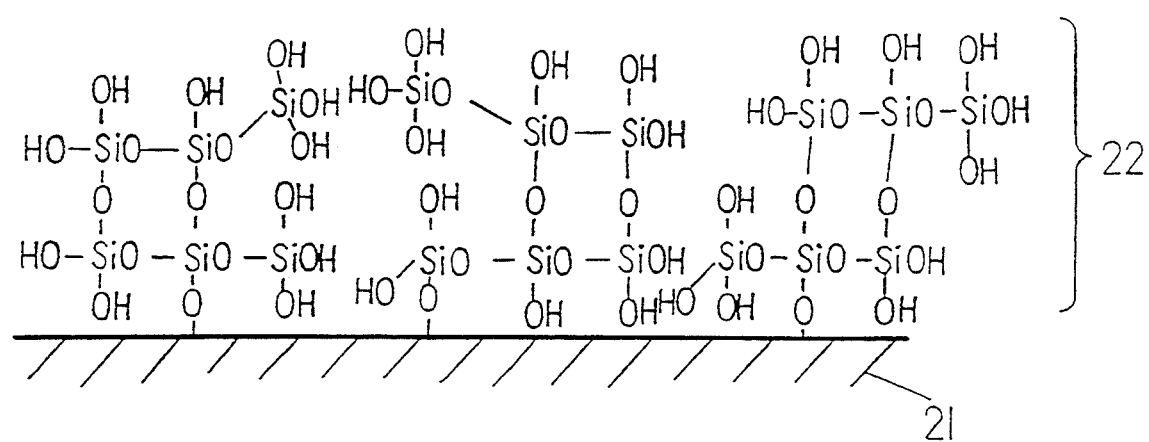
FIG. 10 is a schematic view, enlarged to a molecular level, showing the process as in example 3 of the invention.

By subsequently drying the coating in a moisture-containing atmosphere a dehydrochlorination reaction occurred between —Cl groups remaining without reaction with the substrate and water. Thus, a coating film 22 of polysiloxane was formed, as shown in FIG. 10. The coating film thus formed bonded to the substrate surface by chemical bonds of —SiO—. The surface of the siloxane coating film had numerous —SiOH bonds.

Figure 11:
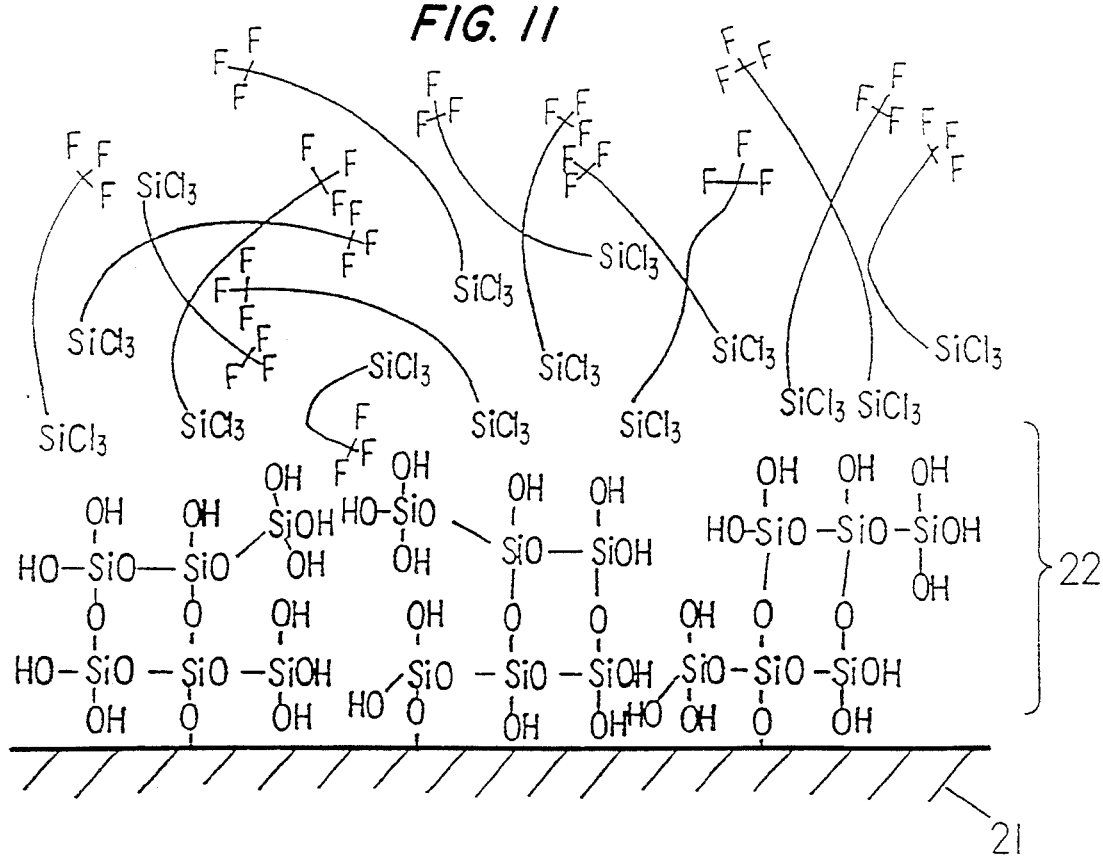
FIG. 11 is a schematic view, enlarged to a molecular level, showing the process as in example 3 of the invention.
Figure 12:
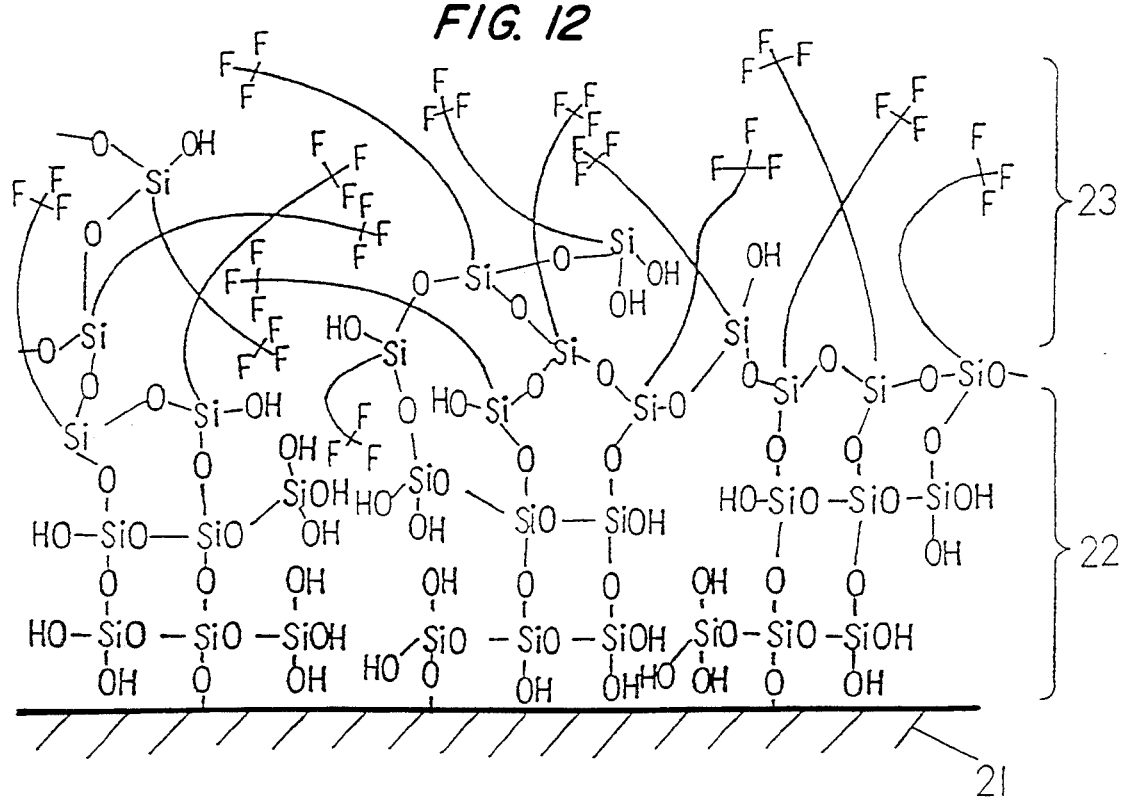
FIG. 12 is a schematic view, to an enlarged scale, showing the process as in example 3 of the invention.

Subsequently, further coating was done using a non-aqueous solution containing a mixture of fine particles and a material containing a fluorocarbon group and a chlorosilane group, for example a solution obtained by dissolving $CF_3—(CF_2)_7(CH_2)_2SiCl_3$ to a concentration of 2.0% in a solvent containing 90% of n-hexadecane and 10% of chloroform (FIG. 11). The coating was baked at 200° C. for about 30 minutes. Since the polysiloxane coating film and hydrophilic fine surface particles have —OH groups exposed on their surfaces, a dehydrochlorination reaction was brought about between chlorosilyl groups of the fluorine-containing chlorosilane surface active material and the —OH groups. A fluorine-containing siloxane fluorocarbon-based polymer film 23 was thus chemically bonded to the inner polysiloxane coating film and the fine particles (FIG. 12).

Figure 13:
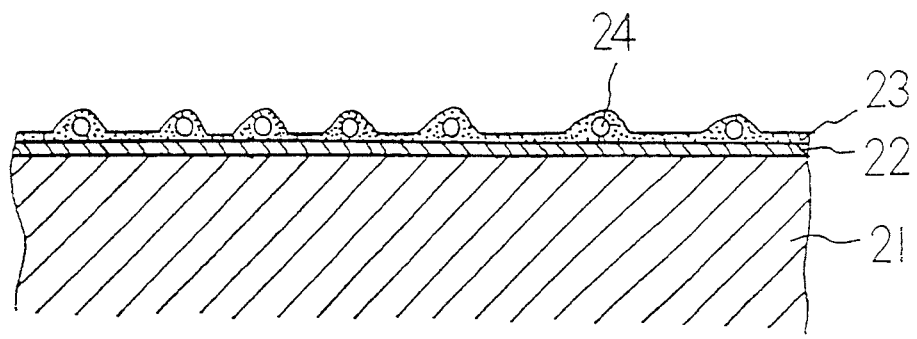
FIG. 13 is a schematic view, to an enlarged scale, showing a water- and oil-repelling film obtained as in example 3 of the invention.

As another an example, by preparing a solution containing 80% of n-hexadecane, 12% of carbon tetrachloride and 8% of chloroform by dissolving 1% of $CF_3CH_2O(CH_2)_{15}SiCl_3$ and silica fine particles 24 with a diameter of 0.5 to 50 microns, preferably 1 to 10 microns, and containing hydrophilic —OH groups on the surface to a concentration of about 10%, coating on the substrate surface formed with the polysiloxane adsorbing film containing many —SiOH bonds and baking the coating in a moisture-containing atmosphere at 200° C. for about 30 minutes, bonds of $CF_3CH_2O(CH_2)_{15}Si(O—)_3$ were produced. Thus, a fluorocarbon-based coating film having surface irregularities of 0.5 to 50 microns, preferably 1 to 20 microns, and having a thickness of 1 to 5 microns could be obtained (FIG. 13). This coating film did not separate in a checkerboard test.

Further, by adding for example by 3% $SiCl_4$, as a crosslinking agent for the material having a fluorocarbon group and a chlorosilane group, to the solution containing the material, the bonds of $CF_3CH_2O(CH_2)_{15}Si(O—)_3$ are crosslinked three-dimensionally via —Si(O—)$_3$ bonds. Thus, a fluorocarbon-based coating film was obtained, which had about double the hardness of the coating film without the addition of SiCl$_4$.

The fluorocarbon-based coating film thus produced had surface irregularities of about 10 microns and had a water wetting angle of about 140 to 150 degrees.

Figure 14:
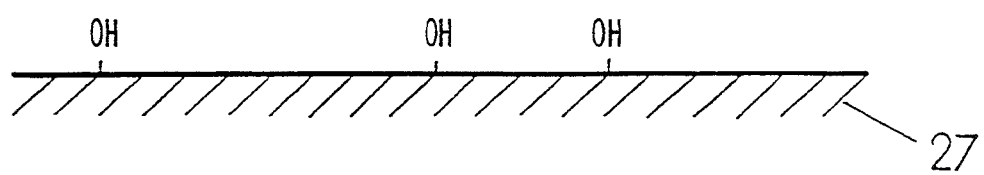
FIG. 14 is a schematic view, enlarged to a molecular level, showing a substrate prior to the process as in example 3 of the invention.

The hydrophilic substrate 27 (FIG. 14) was dipped into a non-aqueous solution, for example a chloroform solution, containing a material having a plurality of chlorosilyl groups for about one hour. Because of the presence of hydrophilic -OH groups on the surface of the substrate 27, a dehydrochlorination reaction was brought about on the surface. Thus, molecules represented above by formula [1] were adsorbed to the substrate surface.

By subsequently washing with a non-aqueous solution, for example chloroform, non-reacted materials were washed away. Following washing with water, a chemically adsorbed monomolecular film of polysiloxane represented by the formula [2];

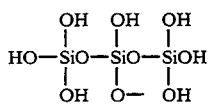

Figure 15:
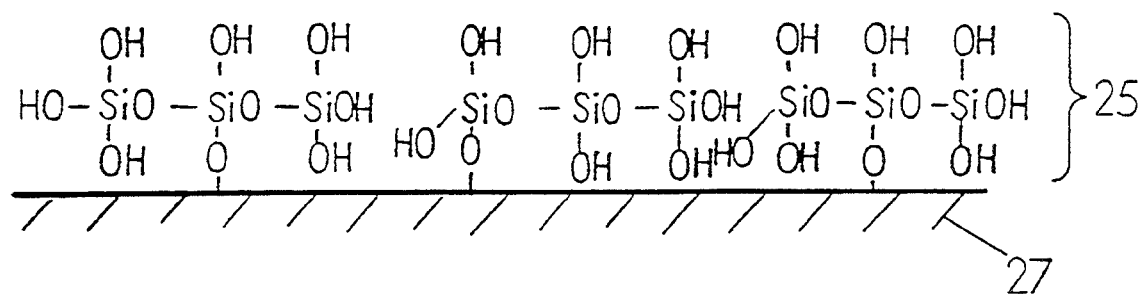
FIG. 15 is a schematic view, enlarged to a molecular level, showing the process as in example 3 of the invention.

Formula [2]

could be obtained on the substrate surface (FIG. 15).

The monomolecular film 25 thus produced is bonded by chemical bonds (i.e., covalent bonds) of —SiO— to the substrate, and thus is difficult to separate. It has numerous —SiOH bonds on its surface.

As a further example, a non-aqueous solution containing a material having a fluorocarbon group and a chlorosilane group and hydrophilic fine surface particles was prepared. For example a solution containing 80 % of n-hexadecane, 12% of carbon tetrachloride and 8% of chloroform was prepared by dissolving 1% of

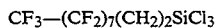

and about 10% of fine particles 24 of silica with a diameter of 0.5 to 50 microns, preferably 1 to 10 microns, and with the surface containing hydrophilic —OH groups. This solution was coated on the substrate provided with the monomolecular film having many —SiOH bonds on the surface and baked in a moisture-containing atmosphere at 200° C. for 30 minutes. As a result, bonds of

Figure 16:
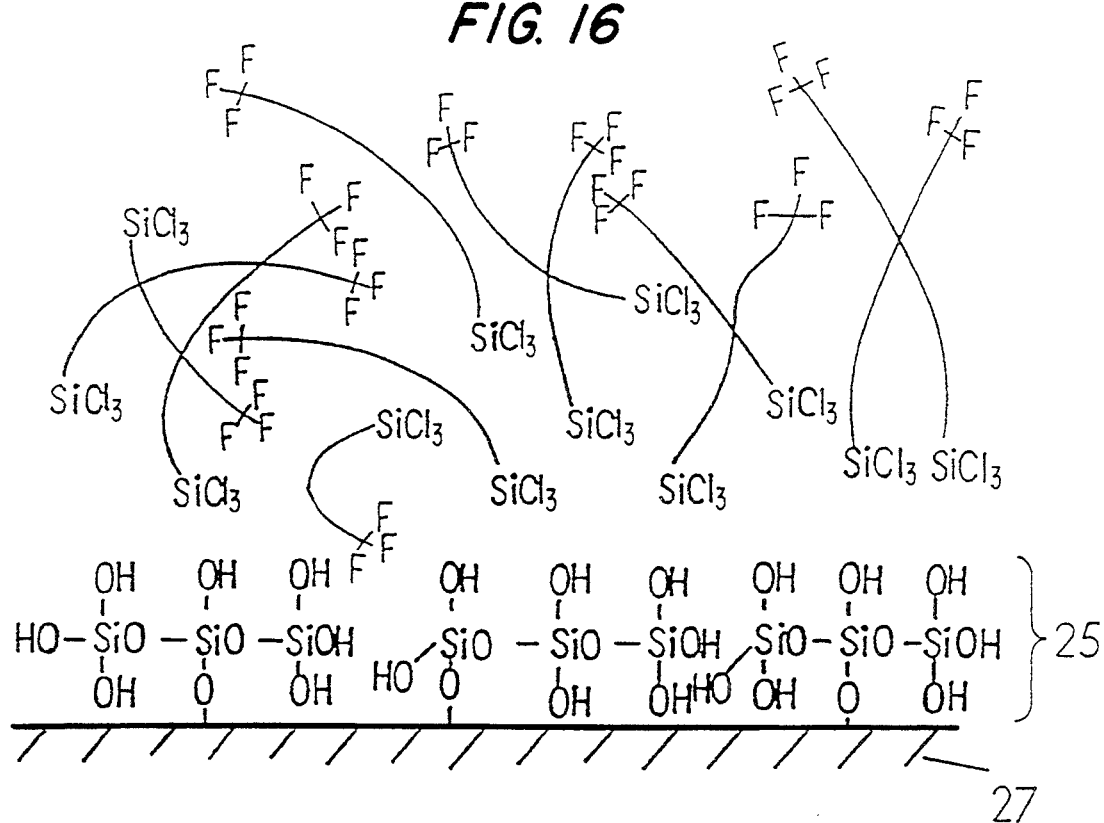
FIG. 16 is a schematic view, enlarged to a molecular level, showing the process as in example 3 of the invention.
Figure 17:
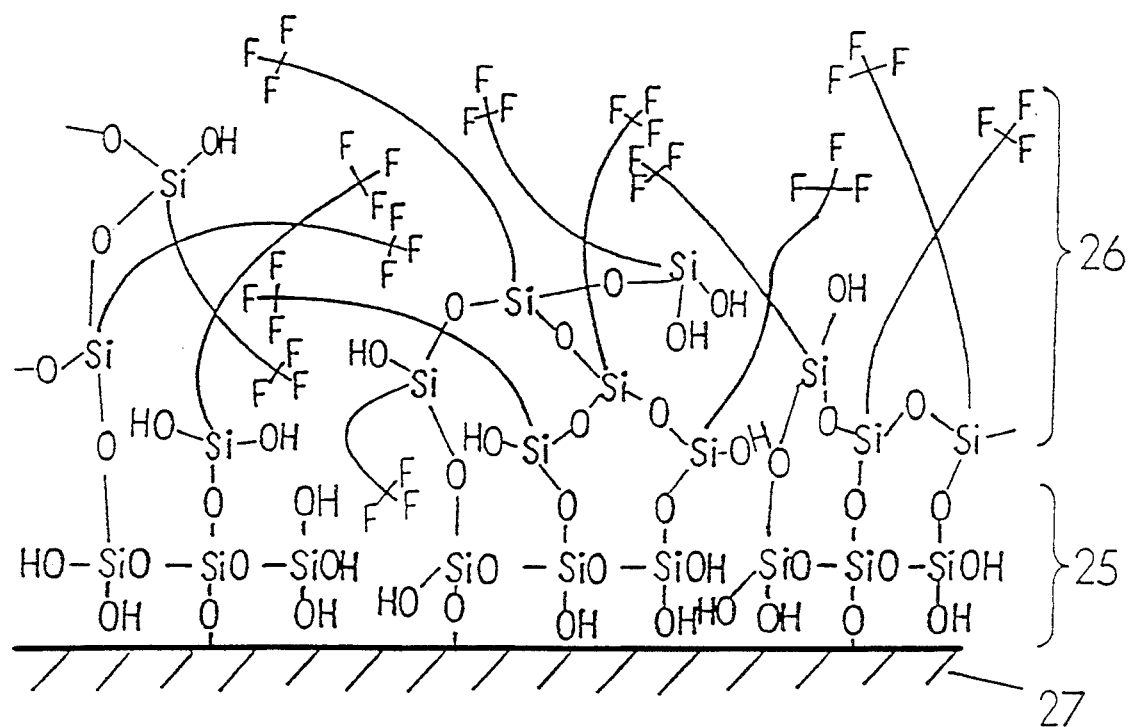
FIG. 17 is a schematic view, enlarged to a molecular level, showing the process as in example 3 of the invention.
Figure 18:
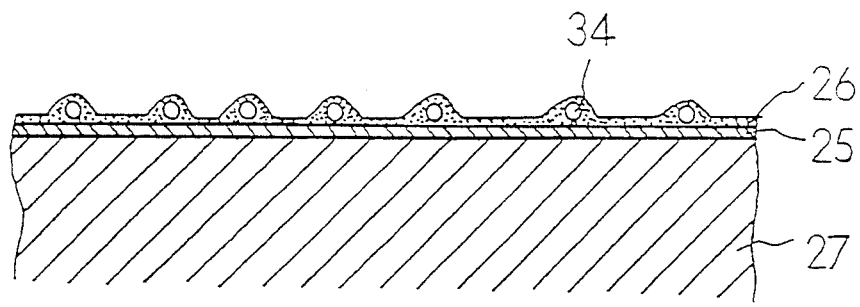
FIG. 18 is a schematic view, to an enlarged scale, showing a water- and oil-repelling film obtained as in example 3 of the invention.

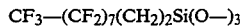

were produced (FIG. 16). A fluorocarbon-based coating film 26 having surface irregularities of 0.5 to 50 microns, preferably 1 to 10 microns, having a thickness of 1 to 20 microns and containing fine particles could be formed which are bonded to the inner polysiloxane monomolecular film (FIG. 17). This coating film was difficult to separate in a checkerboard test.

Further, by adding 15% by weight of SiCl$_4$ as a crosslinking agent for the material having a fluorocarbon group and a chlorosilane group to the solution containing the material, a fluorocarbon-based coating film having about five times the hardness, could be obtained.

Further, by carrying out the coating with a non-aqueous solution contaiing a material having a fluorocarbon group and a chlorosilane group, to which about 20 wt. % of fine particles of fluorocarbon-based polymer (i.e., ethylene polytetrafluoride) was further dispersed, a fluorocarbon-based coating film with surface irregularities could be obtained, which had excellent adhesion compared to that in the prior art although the hardness was comparable thereto.

By adding or incorporating an ethylene group or an acetylene group to or into alkyl chain portion, crosslinking is obtained by irradiation with an electron beam of about 5 Mrads. after the formation of the coating film. A coating film having about 10 times the hardness is obtained.

EXAMPLE 4

Figure 19:
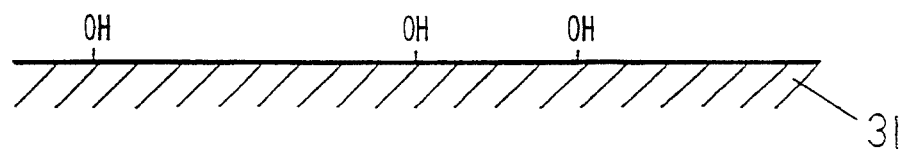
FIG. 19 is a schematic view, enlarged to a molecular level, showing a substrate prior to the process as in example 4 of the invention.

As in the case of example 3, a hydrophilic substrate 31 as shown in FIG. 19 was dipped and held in a non-aqueous solution containing a material having a plurality of chlorosilyl groups and then removed. Since the surface of the substrate 31 had hydrophilic —OH groups, a dehydrochlorination reaction was brought about on the surface, and molecules as represented: Cl(SiCl$_2$O)$_2$-SiCl$_3$ were secured by —SiO— bonds to the substrate such as above formulas [1] to [2].

Figure 20:
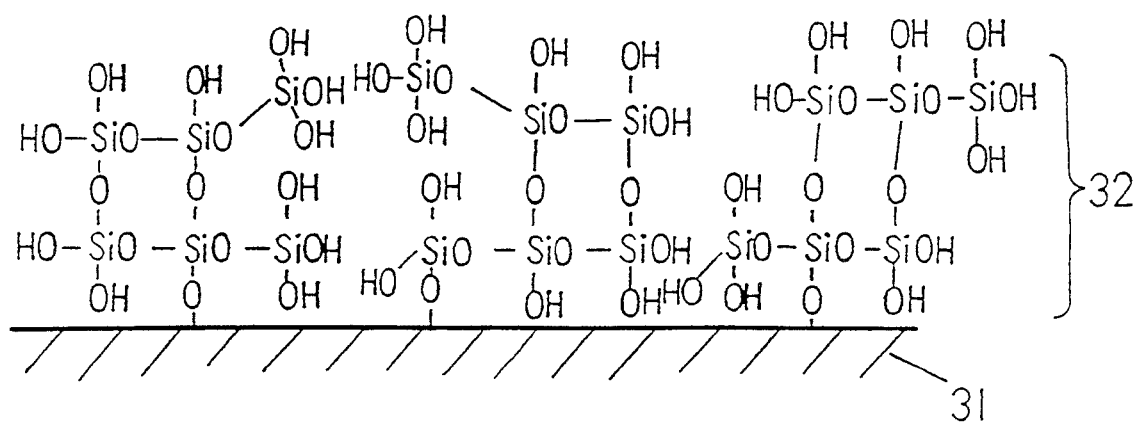
FIG. 20 is a schematic view, enlarged to a molecular level, showing the process as in example 4 of the invention.

By subsequently drying the system in a moisture-containing atmosphere, a coating film 32 (FIG. 20) of polysiloxane could be obtained through a dehydrochlorination reaction brought about between unreacted —Cl groups and water. The coating film of polysiloxane thus obtained was coupled to the substrate surface by chemical bonds of —SiO— and was difficult to separate. It had numerous —SiO— bonds on the surface.

As a further example, an alcohol solution containing a material having a fluorocarbon group and an alkoxysilane group and fine particles containing hydrophilic —OH groups on the surface was prepared. For example, by coating an ethanol solution obtained by dissolving 1% of

Figure 21:
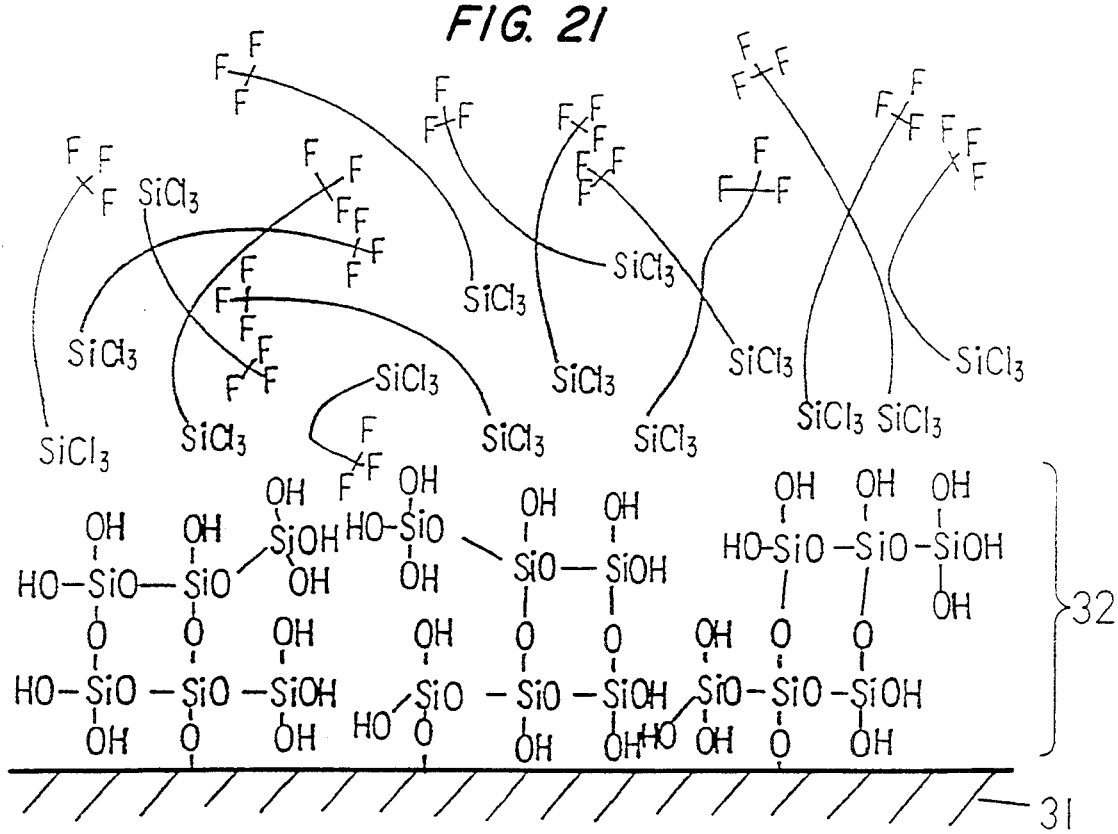
FIG. 21 is a schematic view, enlarged to a molecular level, showing the process as in example 4 of the invention.

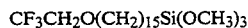

and about 10% of fine particles 34 of silica with a diameter of 0.5 to 50 microns, preferably 1 to 10 microns, and having hydrophilic —OH groups on the surface (FIG. 21), on the substrate provided with the polysiloxane coating film having numerous —SiOH bonds on the surface and baking the coating at 200° C. for about 30 minutes, bonds of

Figure 22:
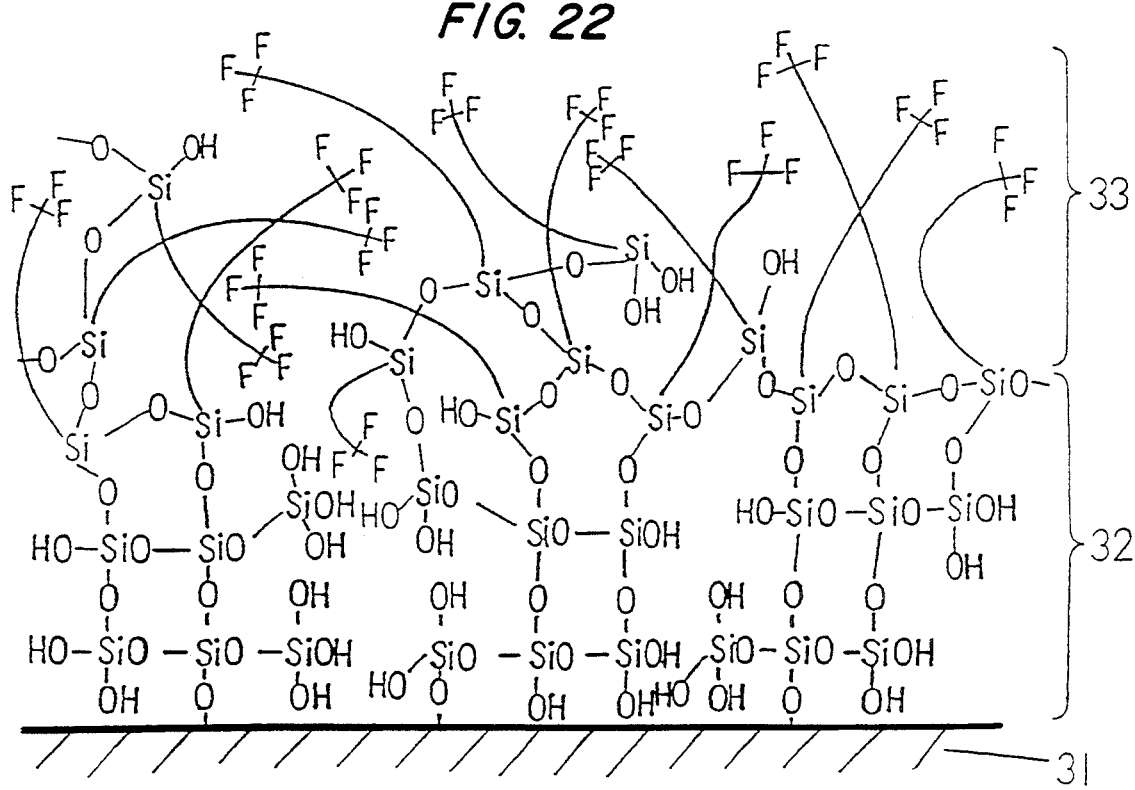
FIG. 22 is a schematic view, enlarged to a molecular level, showing a state after the process as in example 4 of the invention.
Figure 23:
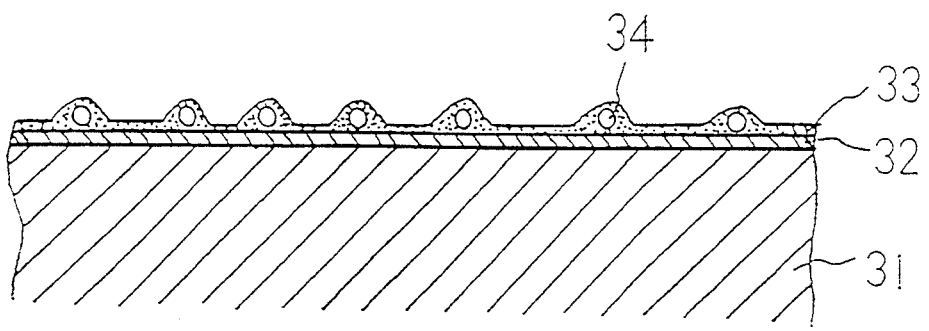
FIG. 23 is a schematic view, at an enlarged scale, showing a water- and oil-repelling film obtained as in example 4 of the invention.

were produced. A fluorocarbon-based coating film having surface irregularities of 0.5 to 50 microns (μm), preferably 1 to 10 microns, and a thickness of 1 to 5 microns were obtained (FIG. 22 and 23). This coating film 33 did not separate in a checkerboard test.

Further, by adding for example by 5% by weight Si(OCH$_3$)$_4$, as a crosslinking agent for the material having a fluorocarbon group and an alkoxysilane group to the solution containing the material, the bonds of

were crosslinked three-dimensionally by —Si(O—)$_3$. A fluorocarbon-based coating film was thus obtained, which had about double the hardness of a coating film obtained without addition of Si(OCH$_3$)$_4$.

The fluorocarbon-based coating film thus obtained had surface irregularities of about 10 microns, and had a water contact angle of about 135 to 140 degrees.

Figure 24:
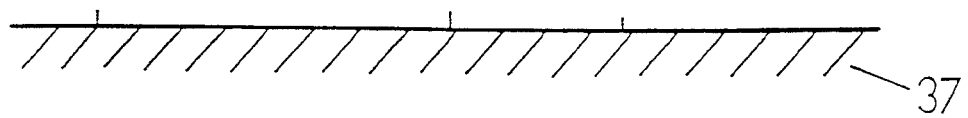
FIG. 24 is a schematic view, enlarged to a molecular level, showing a substrate prior to the process aws in example 4 of the invention.

Further, the hydrophilic substrate 37 (FIG. 24) was dipped and held in a non-aqueous solution containing a material having a plurality of chlorosilyl groups (for example the solution was obtained by dissolving 1% by weight of the material in chloroform solvent).

With Cl—(SiCl$_2$O)$_2$—SiCl$_3$ used as the material having a plurality of chlorosilyl groups, for example, a dehydrochlorination reaction was brought about on the surface because of the presence of hydrophilic OH groups on the surface of the substrate 37, and the molecules represented above by formula [1] were adsorbed to the substrate surface.

Figure 25:
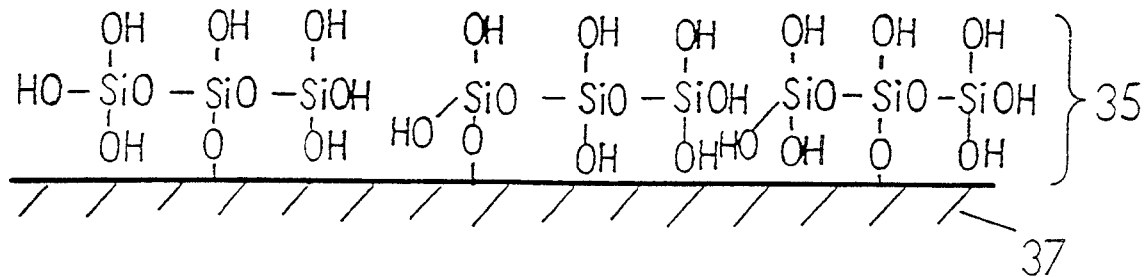
FIG. 25 is a schematic view, enlarged to a molecular level, showing the process as in example 4 of the invention.

By subsequently washing the substrate with a non-aqueous solvent, for example chloroform, and then with water, unreacted molecules were removed, thus obtaining a polysiloxane monomolecular film 35 represented above by formula [2] (FIG. 25).

The monomolecular film 15 thus obtained was perfectly bonded to the substrate via chemical bonds of —SiO— and were difficult to separate. Its surface had numerous —SiO— bonds.

As a further example, a solution containing a material having a fluorocarbon-based group and an alkoxysilane group and fine particles with a hydrophilic surface was prepared. For example, a methanol solution containing 1% of

Figure 26:
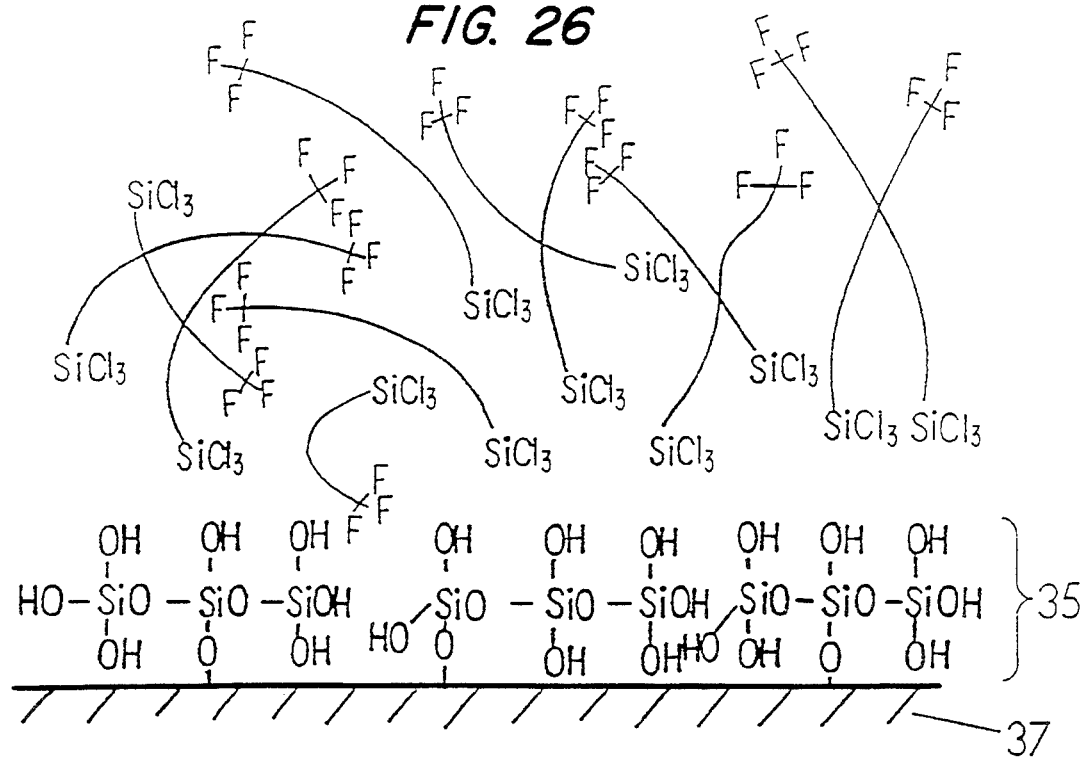
FIG. 26 is a schematic view, enlarged to a molecular level, showing the process as in example 4 of the invention.
Figure 27:
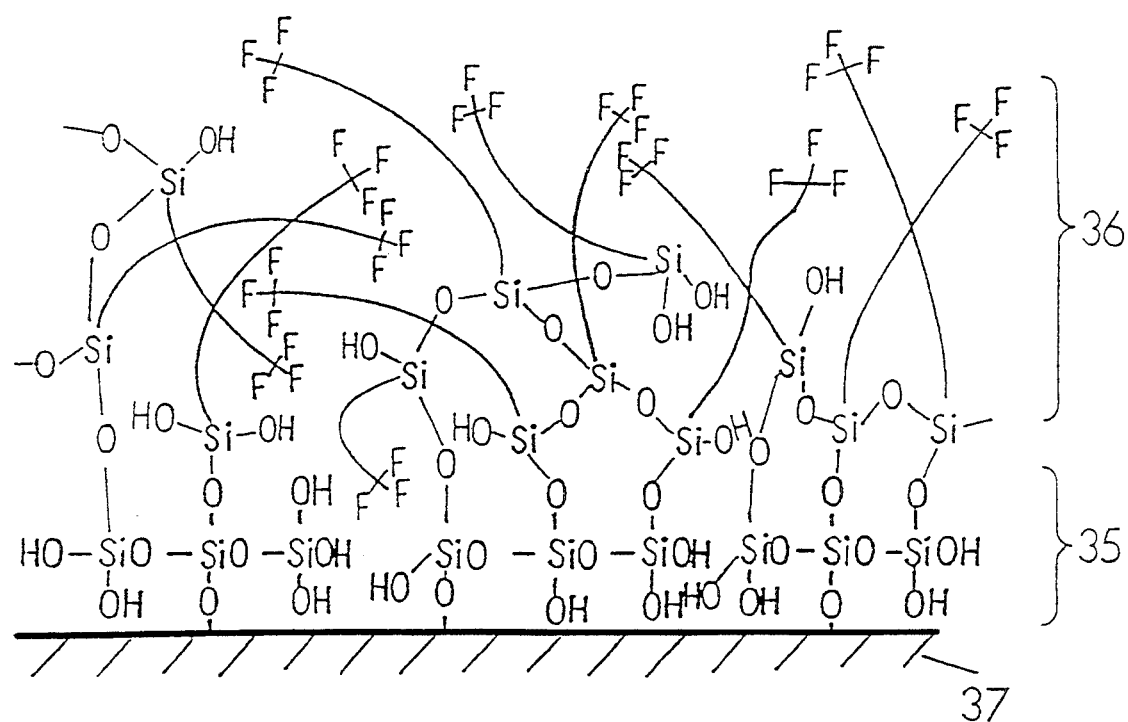
FIG. 27 is a schematic view, enlarged to a molecular level, showing a state after the process as in example 4 of the invention.
Figure 28:
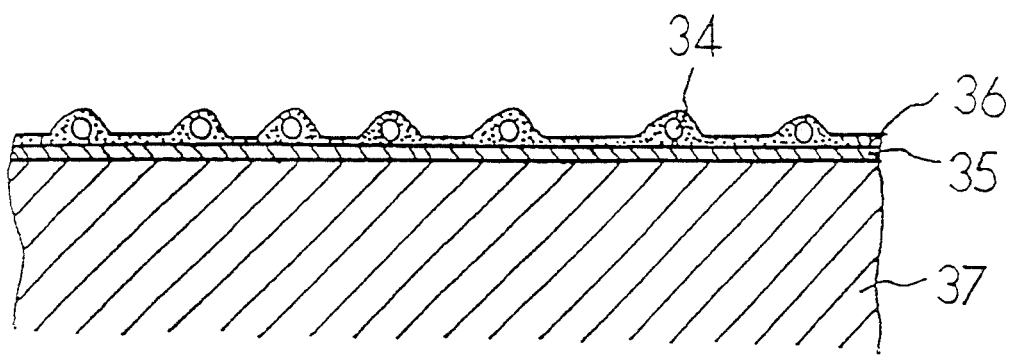
FIG. 28 is a schematic view, to an enlarged scale, showing a water- and oil-repelling film obtained as in example 4 of the invention.

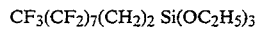

$$CF_3(CF_2)_7(CH_2)_2 Si(OC_2H_5)_3$$

and about 10% of fine particles 34 of silica with a diameter of 0.5 to 50 microns, preferably 1 to 10 microns and containing hydrophilic —OH groups on the surface was prepared. The solution was coated on the substrate provided with the monomolecular film having numerous —SiOH groups on the surface (FIG. 26) and baked at 200° C. for about 30 minutes, thus producing CF$_3$(CF$_2$)$_7$(CH$_2$)$_2$Si(O—)$_3$ bonds. A fluorocarbon-based coating film 36 with surface irregularities of 0.5 to 50 microns, preferably 1 to 10 microns, was formed (FIGS. 27 and 28). This coating film 36 was chemically bonded to the inner polysiloxane monomolecular film and did not separate in a checkerboard test. Further, by adding 10% as a crosslinking agent for the material containing a fluorocarbon group and an alkoxysilane group to the solution containing the material, a fluorocarbon-based coating film having about four times the hardness was obtained.

Similar coating was carried out by further dispersion adding 20% of fine particles of fluorocarbon-based polymer (i.e., polyethylene tetrafluoride) to the non-aqueous solution containing the material having a fluorocarbon group and an alkoxysilane group, a fluorocarbon-based coating film could be obtained, which had excellent adhesion compared to the prior art although the hardness was comparable.

In the above example, by adding or incorporating an ethylene group or acetylene group into the alkyl chain portion, the coating film can be crosslinked after formation thereof by irradiating it with an electron beam of about 5 Mrads. Thus, a coating film which was about 10 times as hard could be readily obtained.

In the above example, after processing the substrate surface with a compound having a chlorosilyl group, a polysiloxane film is formed. On this film is formed a thin film chemically bonded to the substrate surface by using as a compound having a fluorocarbon group and a siloxane group, for example a surface active material containing a chlorosilane compound and an alkylsilane compound, and reacting the material with —OH groups on the surface. At this time, hydrophilic fine particles are provided to increase adhesion. By so doing, an excellent water- and oil-repelling and durable fluorine-containing coating film is satisfactorily adhered to the substrate.

EXAMPLE 5

Figure 29:
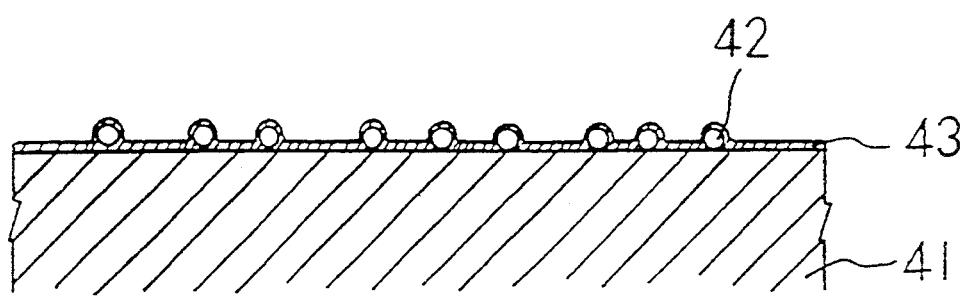
FIG. 29 is a schematic sectional view for explaining a process of manufacturing a water- and oil-repelling process as in example 5 of the invention.

As shown in FIG. 29, a hydrophilic substrate 41, for example a substrate of glass or a ceramic material or a metal such as Al or Cu or a plastic substrate with the surface thereof rendered to be hydrophilic, is prepared. When a plastic substrate without any oxide film on the surface is to be used, the surface may be made hydrophilic, i.e., hydroxyl groups were introduced into the surface, in advance by treating the surface in an oxygen-containing plasma atmosphere at 100 W for 20 minutes. Then, the substrate surface is coated by a casting process with a mixture containing, in a ratio of about 1:1, fine particles 42 of silica with a diameter of 1 to 20 microns, preferably about 10 microns, for example, "Microsheargel DF10-60A" or "-120A" by Asahi Glass Co., Ltd., and silicate glass, "Hard Coating Agent KP-1100A" or "-1100B" by Shinetsu Kagaku Kogyo Co., Ltd. or "Si-80000" by Tokyo Ohka Kogyo Co., Ltd. The coating is then thermally treated at 500° C. for 30 minutes or subjected to plasma ashing at 300 W for about 20 minutes. As a result, a glass layer 43 with surface irregularities on the micron level can be formed on the substrate surface. Then, coating is carried out with a non-aqueous solution containing a material having a fluorocarbon group and a chlorosilane group, for example a solution obtained by dissolving several per cent of

Figure 30:
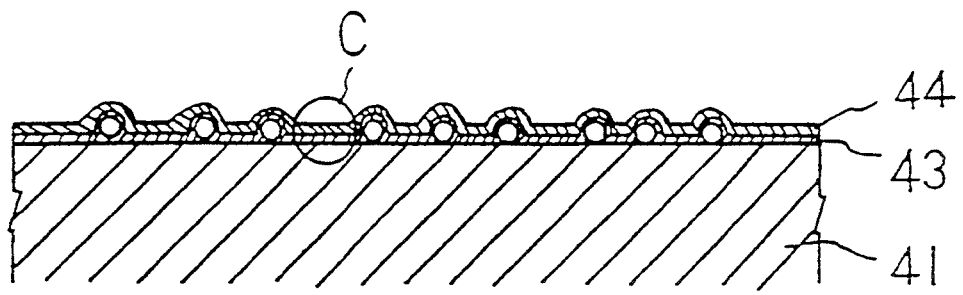
FIG. 30 is a schematic view for explaining a process of manufacturing a water- and oil-repelling coating film as in example 5 of the invention.

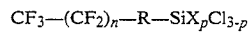

$$CF_3-(CF_2)_n-R-SiX_pCl_{3-p}$$

where n, R, X and p are as noted above in a solution containing 90% of normal hexadecane and 10% of chloroform, followed by baking in a moisture-containing atmosphere at 200° C. for about 30 minutes. As a result, —OH groups are exposed on the surface of the glass layer 43, and a hydrochloric acid reaction is brought about between the chlorosilyl groups of the fluorine-containing chlorosilane-based surface active agent and the —OH groups, thus producing bonds of —Si(O—)$_3$ on the surface. A fluorine-containing siloxane fluorocarbon-based polymer film 44 is formed on the glass layer, which has surface irregularities on the micron level, such that it is chemically bonded to the glass layer surface (FIG. 30).

As an example, by dip coating the surface of a glass substrate using "DF10-60A" having a diameter of about 10 microns as the fine particles and "KP-1100A" as the silicate glass, followed by thermal treatment (i.e., baking) at 350° C. a glass layer with surface irregularities of about 10 microns could be obtained. Subsequently, the substrate provided with the polysiloxane coating film having numerous —SiOH groups on the surface was coated with a solution containing 80% of n-hexadecane, 12% of carbon tetrachloride and 8% of chloroform into which about 1% by weight of CF$_3$CH$_2$O(CH$_2$)$_{15}$SiCl$_3$ was dissolved. After coating, the substrate was baked in a moisture-containing atmosphere at 200° C. for 30 minutes, thus producing bonds of

$$CF_3CH_2O(CH_2)_{15}Si(O—)_3$$

Figure 32:
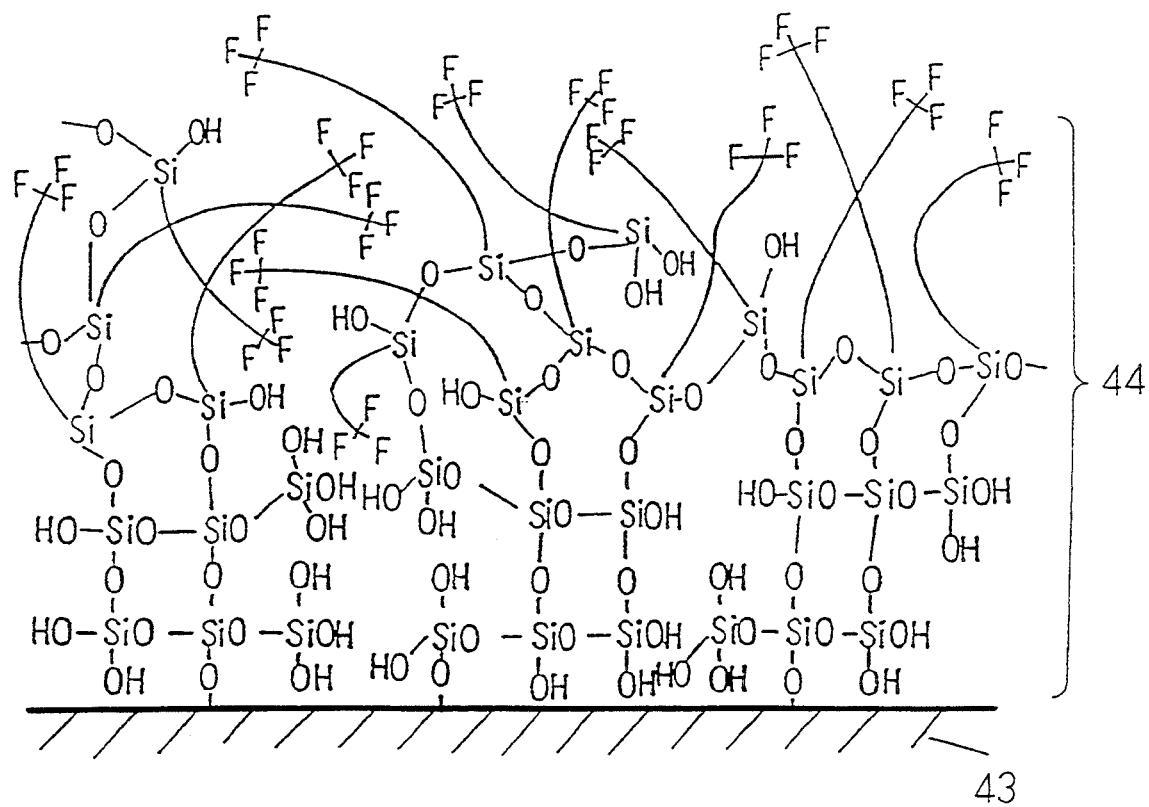
FIG. 32 is a schematic sectional view, enlarged to a molecular level, showing the water- and oil-repelling coating film, i.e., a portion C as in FIG. 30.
Figure 33:
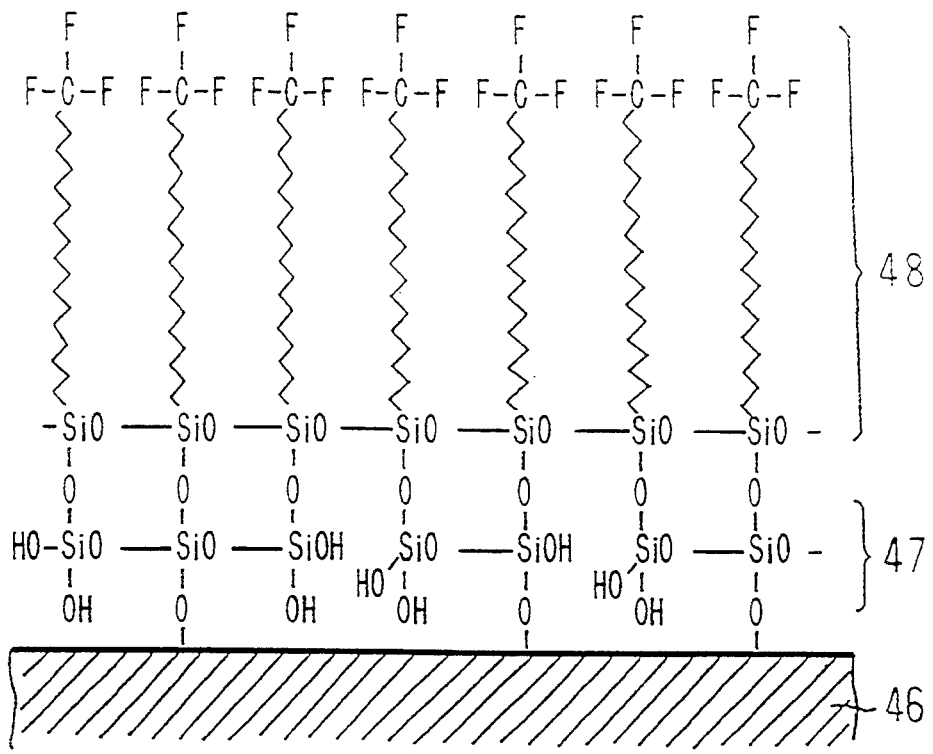
FIG. 33 is a schematic sectional view, enlarged to a molecular level, showing a water- and oil-repelling coating film in the form of a monomolecular film as in example 9 of the invention.

Thus, a fluorocarbon-based coating film 44 with surface irregularities of about 10 microns and having a thickness of 1 to 5 microns, was obtained (FIG. 30 and 32). This coating film did not separate in a checkerboard test.

In this case, by adding as a crosslinking agent for the material having a fluorocarbon group and a chlorosilane group 3% by weight $SiCl_4$ to the solution containing the material, a fluorocarbon-based coating film having about double the hardness was obtained.

Figure 31:
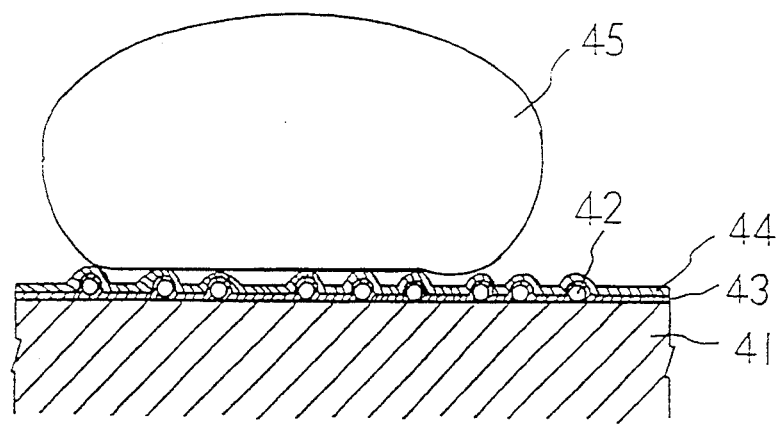
FIG. 31 is a schematic sectional view showing what happens when water drops strike a water- and oil-repelling coating film as in example 5 of the invention.

This fluorocarbon-based coating film had surface irregularities of about 10 microns and a water contact angle of about 130 to 140 degrees. The water contacting is shown in FIG. 31.

EXAMPLE 6

As in the preceding Example 5, a glass layer having surface irregularities is formed on a substrate as shown in FIG. 29, and then coated with an alcohol solution containing a material having a fluorocarbon group and an alkoxysilane group, for example a solution obtained by dissolving several per cent of $CF_3-(CF_2-)_n-R-SiY_q(OA)_{3-q}$ where n represents O or an integer, R represents an alkyl group, an ethylene group, an acetylene group or a substituted group containing a silicon or hydrogen atom, Y represents a substituted group such as an alkyl group, and OA represents an alkoxy group (A representing a hydrogen atom or an alkyl group), in methanol, followed by baking at 200° C. for about 30 minutes. An alcohol elimination reaction (dealcoholation) is thus brought about between alkoxyl groups in the fluorine-containing alkoxysilane-based surface active agent and the —OH groups exposed at the surface of the glass layer 43, thus producing $-Si(O-)_3$ bonds on the surface. Thus, as in Example 5, a fluorine-containing siloxane fluorocarbon-based polymer film is formed on the irregular surface of the glass layer.

As an example, an ethanol solution was prepared by dissolving about 1% of $$CF_3CH_2O(CH_2)_{15}Si(OCH_3)_3$$

and coated on the substrate provided with the polysiloxane coating film having many surface —SiOH bonds, followed by $$CF_3CH_2O(CH_2)_{15}Si(O-)_3$$

baking at 200° C. for about 30 minutes. A fluorocarbon-based polymer film with surface irregularities of about 10 microns and having a thickness of 1 to 5 microns was thus obtained (FIG. 30). This coating film did not separate in a checkerboard test.

By adding, as a crosslinking agent for the material containing a fluorocarbon group and an alkoxysilane group 5% by weight $Si(OCH_3)_4$ to the solution containing the material, bonds of $CF_3CH_2O(CH_2)_{15}Si(O-)_3$ were crosslinked three-dimensionally via bonds of $-Si(O-)_3$. A fluorocarbon-based polymer film was obtained which had about 2 to 2.5 times the hardness of a film obtained without use of $Si(OCH_3)_4$.

When water drops 45 were caused to fall onto this fluorocarbon-based polymer film with surface irregularities of about 10 microns, they contacted the film only at raised portions. Thus, the film was highly water-repelling, as shown in FIG. 31, and its water contact angle was about 135 to 140 degrees.

By adding about 10% by weight of $Si(OC_3H_7)_4$ as a crosslinking agent for the material containing a fluorocarbon group and an alkoxysilane group to the solution containing the material, a fluorocarbon-based polymer film having about four times the hardness was obtained.

When similar coating was carried out using the non-aqueous solution containing a material containing a fluorocarbon group and an alkoxysilane group, to which was added 20% of fine particles of fluorocarbon-based polymer (i.e., polyethylenetetrafluoride), a fluorocarbon-based polymer film was obtained, which had excellent adhesion was highly water- and oil-repelling although hardness was such as that obtainable in the prior art.

By adding or incorporating an ethylene group or acetylene group into the alkyl chain portion, the coating film was crosslinked by irradiating it with an electron beam of about 5 Mrads. A coating film having about 10 times the hardness was readily obtained.

EXAMPLE 7

As in the previous Example 5, a glass layer having surface irregularities was formed on a glass substrate as shown in FIG. 29. Then, the substrate, being provided with the monomolecular film having numerous surface —SiOH bonds, was dipped for about 30 minutes in a non-aqueous solution and held. The solution contained a material having a fluorocarbon group and a chlorosilane group. For example a solution obtained by dissolving about 1% of $CF_2(CF_2)_7(CH_2)_2SiCl_3$ in a solution containing 80% of n-hexadecane, 12% of carbon tetrachloride and 8% of chloroform. As a result, bonds of $$CF_2(CF_2)_7(CH_2)_2Si(O-)_3$$

were formed on the substrate surface, thus forming a fluorine-containing water- and oil-repelling film 44 (i.e., chemically adsorbed monomolecular film) such that it was chemically bonded to the glass layer and had desirable surface irregularities (FIG. 30). This water- and oil-repelling film 44 (or monomolecular film) did not separate in a checkerboard test. In addition, since the fluorocarbon groups were at the surface, the surface energy was very low, and the water contact angle was 135 to 240 degrees.

By adding or incorporating an ethylene group or acethylene group into the alkyl chain portion, the monomolecular film was crosslinked after formation by irradiation with an electron beam of about 5 Mrads. The hardness was further improved.

EXAMPLE 8

A processed glass plate was prepared. After washing with an organic solution, its surface was coarsened by sand blasting to form surface irregularities on a submicron order of 0.1 to 1.0 microns, for example 0.4 to 0.9 microns. The surface irregularities may also be formed by a chemical etching process using fluorine oxide or a rubbing process using sand paper. Subsequently, the glass plate was dipped and held for about 2 hours in a non-aqueous solution containing a material having a fluorocarbon chain group and a chlorosilane group. For example a solution was obtained by dissolving 1% by weight of $$CF_3(CF_2)_7(CH_2)SiCl_3$$

into a solution containing 80 % of n-hexadecane (or toluene, xylene or dicyclohexyl), 12% of carbon tetrachloride and 8% of chloroform. As a result, a hydrochloric acid removal reaction (dehydrochlorination) was brought about between the —SiCl groups of the material containing a fluorocarbon group and a chlorosilane group and the hydroxyl groups contained in the surface of natural oxide film formed on the glass plate surface, thus producing bonds of $$CF_3(CF_2)_7(CH_2)Si(O-)_3$$

over the entire glass plate surface. Thus, a fluorine-containing monomolecular film was formed which was chemically bonded to the glass plate surface and had a thickness of about 15 angstroms. This monomolecular film was chemically bonded and difficult to separate. With a glass plate comprising a plastic material such as an acrylate resin or a polycarbonate resin, the same technique could be used by oxidizing the coarsened surface to be hydrophilic by a plasma process at 300 W for about 10 minutes and using a freon solvent in lieu of the surface active material.

The processed glass plate was trial used to find that the attachment of contaminants could be greatly reduced compared to a glass plate which was not processed. Contaminants that were attached could be readily removed by rubbing the glass plate with a brush. At this time, no scar or scratch was produced. Further, oily fat contaminants could be removed by merely water washing. The wetting property with respect to water is similar to that of lotus leaves, and the contact angle was 155 degrees.

EXAMPLE 9

With an aluminum plate, which contains less hydroxyl groups although it remains hydrophilic, surface irregularities of about 0.5 to 0.8 micron are formed by electrolytic etching.

Surface irregularities may also be formed by a chemical etching process using fluorine oxide, a plasma spattering process carried out in vacuum or a rubbing process using sand paper. Metal substrates may all be similarly treated. With a substrate of a plastic material such as an acrylate resin or a polycarbonate resin, the same technique is used after coarsening the surface and then oxidizing the surface to be hydrophilic by a plasma process carried out at 200 W for about 10 minutes.

Then, the plate is dipped and held for about 30 minutes in a non-aqueous solution containing a material having a plurality of chlorosilyl groups. For example, a solution was obtained by dissolving 1% by weight of $SiCl_4$ in a chloroform solvent, and a hydrochloric acid removal reaction was brought about owing to the —OH groups present to a certain extent at the aluminum plate surface. A chlorosilane monomolecular film of the material containing a plurality of chlorosilyl groups was formed.

For example, by using $SiCl_4$ as the material containing a plurality of chlorosilyl groups, a dehydrochlorination reaction is brought about owing to the hydrophilic —OH groups exposed at the aluminum plate surface, and molecules of $Cl_3SiO-$ or $Cl_2Si(O-)_2$ are secured to the surface by —SiO— bonds.

By subsequently washing the system with a non-aqueous solvent, e.g., chloroform, and then with water, unreacted $SiCl_4$ molecules are removed from the aluminum plate to obtain a siloxane monomolecular film of $(OH)_3SiO-$ or $(OH)_2Si(O-)_2$ on the aluminum plate surface.

The monomolecular film thus obtained is perfectly bonded to the aluminum plate 46 by chemical bonds of —SiO— and did not separate. In addition, its surface has numerous -SiOH (or silanol) bonds. Further, hydroxyl groups corresponding in number to about three times the initial number are produced.

As an example, the aluminum plate 46, provided with a monomolecular film having numerous surface —SiOH bonds, was dipped and held for about one hour in a non-aqueous solution containing a material containing a carbon fluoride group and a chlorosilane group. For example a solution was obtained by dissolving about 1% of $CF_3(CF_2)_7(CH_2)SiCl_3$ in a solution containing 80% of n-hexadecane, 12% of carbon tetrachloride and 8 % of chlorofrom. As a result, bonds of $$CF_3(CF_2)_7(CH_2)Si(O-)_3$$

were formed on the aluminum plate surface. A fluorine-containing monomolecular film 48 was formed over the entire aluminum plate 46 surface. The film was chemically bonded (i.e., covalently bonded) to the inner siloxane monomolecular film 47 and had a thickness of about 15 angstroms (1.5 nm). I t did not separated in a checkerboard test. Its water contact angle was about 155 degrees.

Further, using a glass plate in lieu of the aluminum plate in the above Example 8, on the surface desired to remain hydrophilic (for example the inner surface) was formed a hydrophilic coating film insoluble in an organic solvent (for example by coating an aqueous solution of polyvinylalcohol (poval) to a thickness of several microns) for the purpose of imparting an anti-fogging effect before carrying out chemical adsorption of the material containing a carbon fluoride group and a chlorosilane group. After the chemical adsorption, the hydrophilic coating film was removed by water washing, thus obtaining a glass plate provided with a monomolecular film (or siloxane film), which had a water- and oil-repelling contamination free outer layer and hydrophilic hydroxyl groups present at the inner surface. The anti-fogging effect of this glass plate was tested to find that its surface was left hydrophilic and could be readily wetted by water and would not fog.

By carrying out the chemical adsoprtion using a mixture of two different surface active materials with different molecular lengths, for example $CF_3(CF_2)_7(CH_2)_2Si(CH_3)_2(CH_2)_9SiCl_3$ and $CF_3(CF_2)_7(CH_2)_2Si(CH_3)_2(CH_2)_6SiCl_3$ or $CF_3(CF_2)_7(CH_2)_2SiCl_3$ and $CF_3(CF_2)_5(CH_2)_2SiCl_3$ the mixture being in a ratio of about 3:1 to 1:3, the water- and oil-repelling properties are further improved.

EXAMPLE 10

Figure 34:
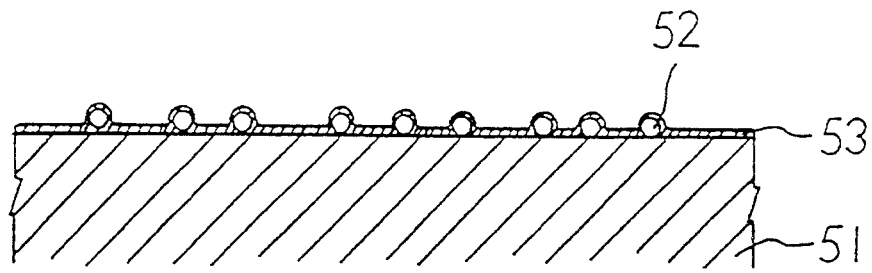
FIG. 34 is a schematic sectional view for explaining a process of manufacture of a water- and oil-repelling process as in example 10 of the invention.

As shown in FIG. 34, a hydrophilic substrate 51 is prepared. As the hydrophilic substrate, glass, ceramics, or metals such as Al and Cu or plastic may be used such that with the surface thereof is made hydrophilic. If a plastic or like substrate without any surface oxide film is to be used, the surface may be made hydrophilic, i.e., hydroxyl groups may be introduced into the surface, in advance by treating the surface in an oxygen-containing plasma atmosphere at 100 W for 20 minutes. The substrate is then coated by a casting process with a mixture of fine particles 52 of silica with an average diameter of 10 microns (for example "Microsheargel DF10-60A" or "-129A" by Asahi Glass Co., Ltd.) and silicate glass (for example "Hard Coating Agent KP-1100A" or "-1100B" by Shinetsu kagaku Co., Ltd. or "Si-8000" by Tokyo Ohka Kogyo Co., Ltd.), the mixture being in a ratio of about 1:1, followed by thermal treatment at 500° C. for 30 minutes or plasma ashing at 300 W for 20 minutes. As a result, a glass layer 53 with surface irregularities at the micron level can be formed. Subsequently, another coating is formed using a non-aqueous solution containing a material having a fluorocarbon group and a chlorosilyl group. For example a solution is prepared by dissolving 2% of

Figure 35:
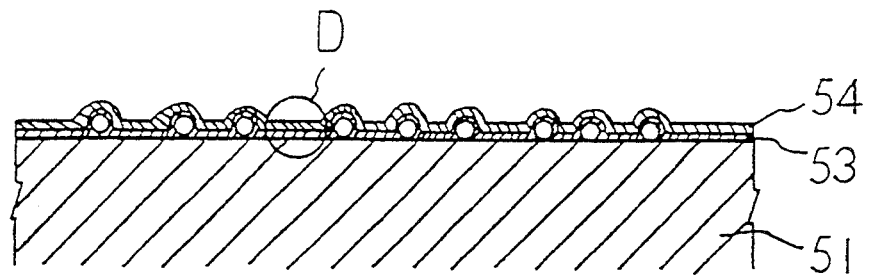
FIG. 35 is a schematic sectional view for explaining a process of manufacturing a water- and oil-repelling coating film as in example 10 of the invention.
Figure 36:
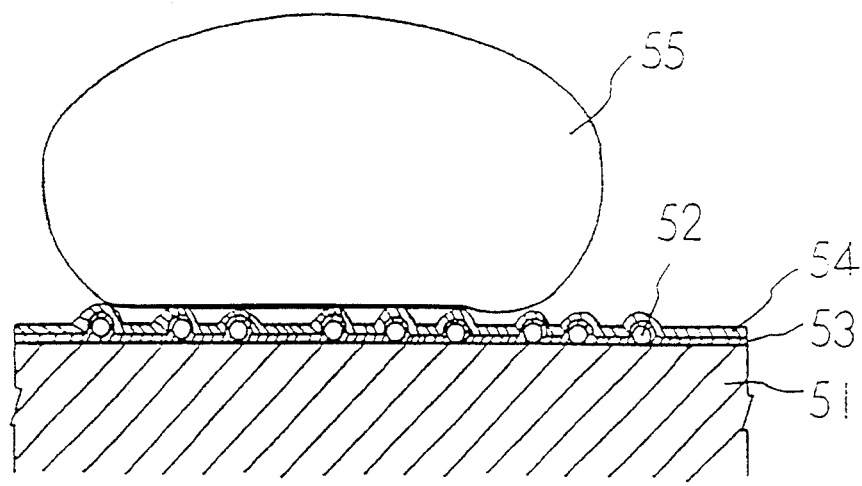
FIG. 36 is a schematic sectional view showing what happens when water drops strike the water- and oil-repelling coating film according to the invention.

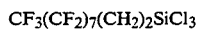
$CF_3(CF_2)_7(CH_2)_2SiCl_3$ in a solution containing 90% of n-hexadecane and 1% of chloroform, followed by baking in a humidified atmosphere at 200° C. for 30 minutes. A dehydrochlorination reaction is brought about between chlorosilyl groups of the fluorocarbon chlorosilane-based surface active material and —OH groups exposed at the surface of the glass layer 53, thus producing —Si(O—)$_3$ bonds at the surface. In this way, a fluorine-containing siloxane fluorocarbon-based polymer film 54 is formed on the glass layer having surface irregularities at the micron level. The film 54 is chemically bonded to the surface and has surface irregularities (FIGS. 35 and 36).

As an example, "DF10-60A" with a diameter of about 10 microns as the fine particles and "KP-1100A" as the silicate glass were dip coated and baked at 350° C. A glass layer with surface irregularities of about 10 microns was obtained.

Figure 38:
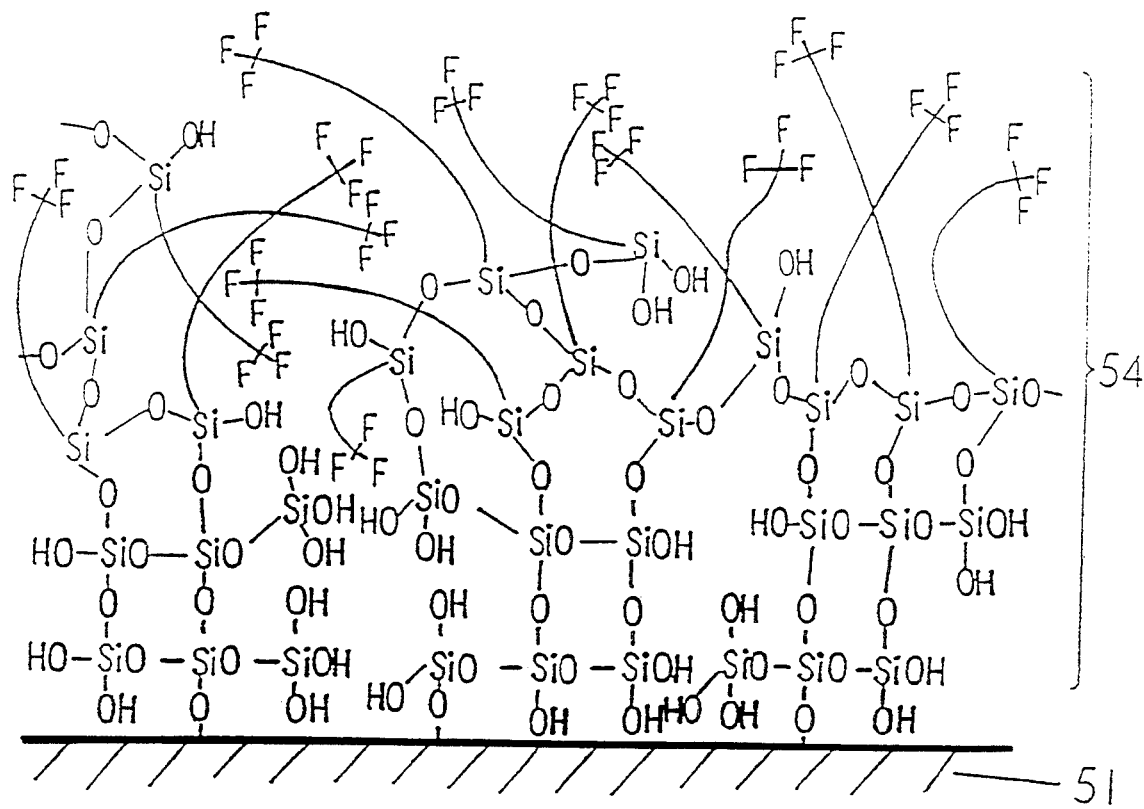
FIG. 38 is a schematic sectional view, enlarged to a molecular level, showing a water- and oil-repelling coating film as in example 10 of the invention.

Subsequently, a solution prepared by dissolving about 1% of $CF_3CH_2O(CH_2)_{15}SiCl_3$ in a solution containing 80% of n-hexadecane, 12 % of carbon tetrachloride and 8% of chloroform, was coated on the substrate with the polysiloxane coating film containing numerous —SiOH bonds at the surface. The coated substrate was baked at 200° C. for 30 minutes. As a result, bonds of $CF_3CH_2O(CH_2)_{15}Si(O—)_3$ were formed. Thus, a fluorocarbon-based polymer film with surface irregularities of about 10 microns and having a thickness of 1 to 5 microns, was formed (FIG. 38). This coating film 54 was difficult to separate in a checkerboard test.

By adding about 3% by weight as SiCl$_4$ as a crosslinking agent for the material containing a fluorocarbon group and a chlorosilane group to the solution containing the material, the bonds of $CF_3CH_2O(CH_2)_{15}Si(O—)_3$ were crosslinked three-dimensionally by —Si(O—)$_3$. Thus, a fluorocarbon-based polymer film having about double the hardness was obtained (FIG. 38).

This fluorocarbon-based polymer film had surface irregularities of about 10 microns, and its water contact angle was 130 to 140 degrees. The water 55 is shown in FIG. 36).

EXAMPLE 11

As in the preceding Example 10, a glass layer having desirable surface irregularities is formed on a substrate as shown in FIG. 34. The surface is then coated with an alcohol solution containing a material having a fluorocarbon group and an alkoxysilane group. For example a solution is prepared by dissolving several % of

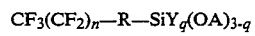
$CF_3(CF_2)_n—R—SiY_q(OA)_{3-q}$ where n represents O or an integer, R represents an alkyl group, an ethylene group, an acetylene group or a substituted group containing a silicon or oxygen atom, Y represents a hydrogen atom or a substituted group such as an alkyl group, OA represents an alkoxyl group (A representing a hydrogen atom or an alkyl group), and q represents 0, 1 or 2, in methanol. The coated substrate the baked at 200° C. for about 30 minutes. As a result, a dehydrochlorination reaction is brought about between alkoxyl groups of the fluorine-containing alkoxysilane-based surface active material and —OH groups exposed to the surface of the glass layer 53, thus producing -Si(O-)$_3$ bonds on the surface. Thus, a fluorine-containing siloxane fluorocarbon-based polymer film 54 is formed on the irregular glass layer surface.

As an example, a solution was prepared by dissolving about 1% of $CF_3CH_2O(CH_2)_{15}Si(OCH_3)_3$ in an ethanol and coated on the substrate with the polysiloxane coating film containing numerous —SiOH bonds at the surface. The coated substrate was then baked at 200° C. for about 30 minutes, thus producing bonds of

$CF_3CH_2O(CH_2)_{15}Si(O—)_3$

A fluorocarbon-based polymer film with surface irregularities of about 10 microns and a thickness of 1 to 5 microns was obtained. This coating film was difficult to separate in a checkerboard test.

Further, by adding for example 5% by weight Si-(OCH$_3$)$_4$ as a crosslinking agent for the material containing a fluorocarbon group and an alkoxysilane group to the solution containing the material, the bonds of

$CF_3CH_2O(CH_2)_{15}Si(O—)_3$ were crosslinked three-dimensionally by —Si(O—)$_3$ bonds. A fluorocarbon-based polymer film was obtained which had about 2 to 2.5 times the hardness of a coating film obtained without use of Si(OCH$_3$)$_4$.

Water drops 55 were allowed to fall onto this fluorocarbon-based polymer film with surface irregularities of about 10 microns. They contacted the film only at raised or projected portions thereof, as shown in FIG. 36. The film was very highly water-repelling, and its water contact angle was about 135 to 140 degrees.

Further, by adding about 10% by weight of Si-(OCH$_3$)$_4$ as a crosslinking agent for the material containing a fluorocarbon group and an alkoxysilane group to the solution containing the material, a fluorocarbon-based polymer film having about four times the hardness could be obtained.

A similar coating process was carried out by adding 20% of fine particles of a fluorocarbon-based polymer (i.e., polyethylene tetrafluoride) to the non-aqueous solution containing the material containing a fluorocarbon group and an alkoxysilane group. A fluorocarbon-based polymer film was obtained which had excellent adhesion and was highly water-and oil-repelling, although the hardness was conventional.

By adding or incorporating an ethylene group or acetylene group into the alkyl chain portion, the coating film can be crosslinked afterwards by irradiating it with an electron beam of about 5 Mrads. A coating film is thus obtained with the hardness thereof increased by ten times.

EXAMPLE 12

As in Example 10, a glass layer 53 having surface irregularities was formed on a substrate 51, as shown in FIG. 34. Then, a non-aqueous solution was prepared by incorporating a material containing a fluorocarbon group and a chlorosilane group. For example a solution was prepared by dissolving about 1% of

in a solution containing 80% of n-hexadecane, 12% of carbon tetrachloride and 8% of chloroform. The substrate provided with the monomolecular film containing numerous SiOH bonds at the surface was dipped and held in the solution for about 30 minutes, thus producing bonds of

Figure 37:
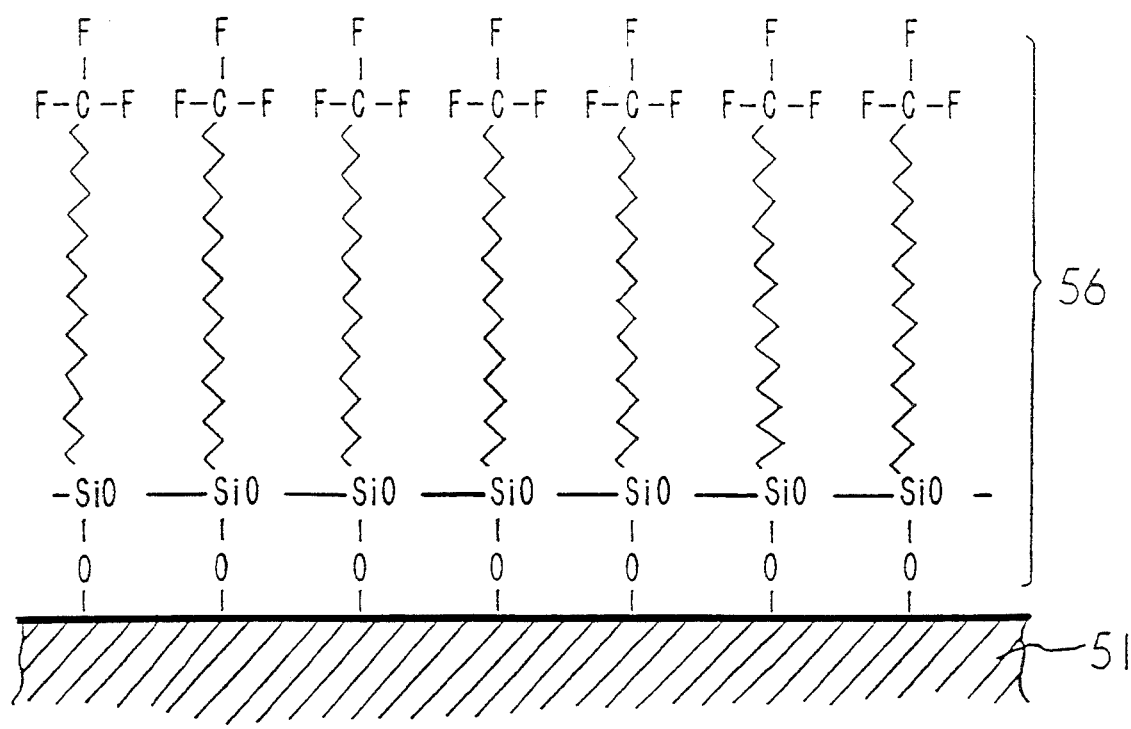
FIG. 37 is a schematic sectional view, enlarged to a molecular level, showing a water- and oil-repelling coating film, i.e., a portion D as in FIG. 35.

on the surface. A fluorine-containing water- and oil-repelling film 56 (i.e., chemically adsorbed monomolecular film) was formed. The film 56 was chemically bonded to the glass layer and had surface irregularities (FIG. 37) at the micron level. This film did not separate in a checkerboard test. In this film, the fluorocarbon groups had regular orientation on the surface, providing very low surface energy, and the water contact angle of the film was 135 to 145 degrees.

By adding or incorporating an ethylene group or acethylene group, into the alkyl chain portion, the monomolecular film is subsequently crosslinked by irradiating it with an electron beam of about 5 Mrads, and thus the hardness can be further improved.

EXAMPLE 13

Figure 39:
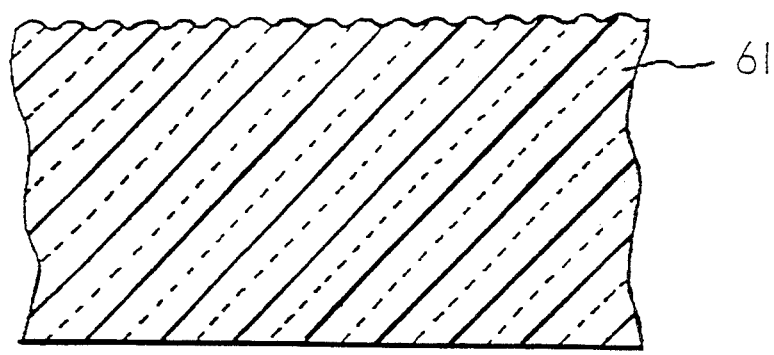
FIG. 39 is a sectional view showing a glass substrate having a coarsened surface used as in example 13 of the invention.

A processed glass plate 61 was washed with an organic solvent, and irregularities of about 0.1 micron were formed at its surface by sand blasting (FIG. 39). As another means for coarsening the surface, a chemical etching process using fluoric acid or a rubbing process using sand paper may be used. The permissible level of coarsening is within the visible light wavelength range. In this case, substantially all visible light is transmitted.

As an example, a glass plate was dipped and held for about 2 hours in a non-aqueous solution containing a material containing a carbon fluoride group and a chlorosilane group. For example a solution was prepared by dissolving 1% by weight of $CF_3(CF_2)_7(CH_2)_2SiCl_3$ in a solution containing 80% of n-hexadecane (or toluene, xylene or disiclohexyl), 12% of carbon tetrachloride and 8% of chloroform. As a result, a dehydrochlorination reaction was brought about between SiCl groups of the material containing a carbon fluoride group and a chlorosilane group and hydroxyl groups numerously contained in the natural oxide film formed on the glass plate, thus producing bonds of

Figure 40:
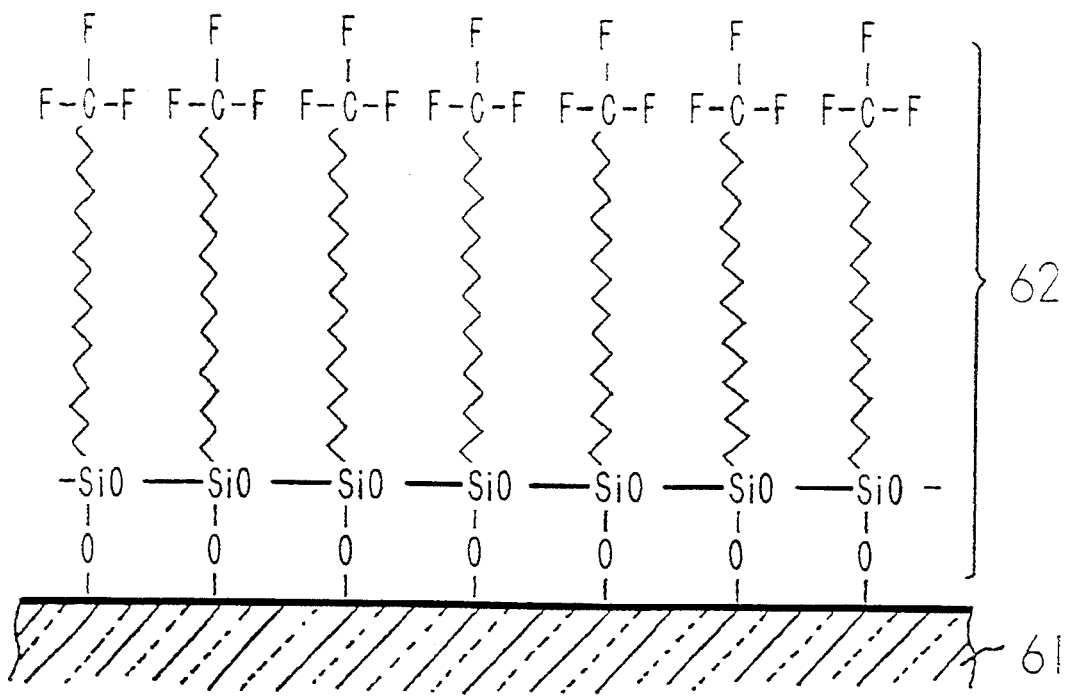
FIG. 40 is a schematic sectional view, enlarged to a molecular level, having the surface of a glass substrate with a monomolecular film formed thereon as in example 13 of the invention.

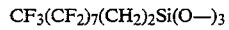

over the entire glass plate surface. A fluorine-containing monomolecular film 62 was formed. The film 62 was chemically bonded to the glass plate surface, and its thickness was about 1.5 nm (15 angstroms) (FIG. 40). The monomolecular film was firmly bonded by siloxane chemical bonds to the substrate surface and did not separate. In a substrate comprising a plastic material, such as an acrylic acid resin or a polycarbonate resin, the same technique may be used by oxidizing the substrate surface to be hydrophilic by a plasma treatment at 300 W for about 10 minutes and using a freon solution in lieu of the surface active material.

The above processed glass plate was actually used to obtain great reduction of the attachment of contaminants compared to a non-processed glass plate. Contaminant attached, if any, could be readily removed by brushing with a brush. At this time, no scar or scratch was caused. The water wetting property was like that of lotus leaves, and the water contact angle was about 155 degrees.

EXAMPLE 14

In this example, an aluminum plate is used, the surface of which contains less hydroxyl groups yet remains hydrophilic. The surface is formed with irregularities of about 0.2 microns by electrolytic etching. The surface irregularities may also be formed by other processes such as a chemical etching process using fluoric acid or a rubbing process using sand paper. Again in this case, the surface irregularities may be within the visible light wavelength range. In this case, substantially all visible light is transmitted. The same technique may be used for all metals. In case of a plastic material such as an acrylic acid resin or a polycarbonate resin, the surface having been coarsened is oxidized to be hydrophilic by a plasma treatment at 200 W for about 10 minutes.

Figure 41:
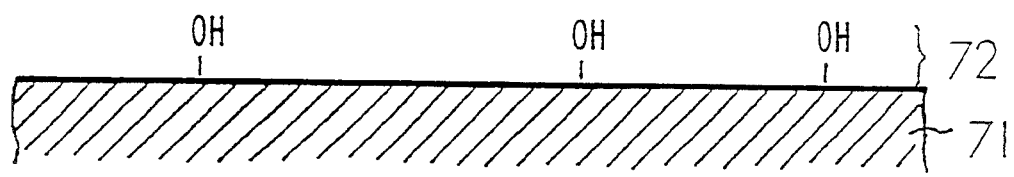
FIG. 41 is a schematic view, enlarged to a molecular level, showing the surface of an aluminum substrate prior to the film forming process as in example 14 of the invention.
Figure 42:
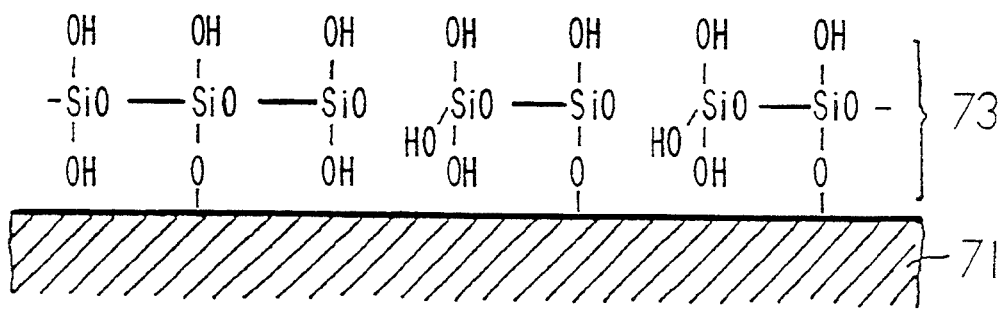
FIG. 42 is a schematic sectional view showing a process of manufacturing a siloxane-bonded monomolecular film as in example 14 of the invention.

The aluminum plate is then dipped and held for about 30 minutes in an aqueous solution containing a material containing a plurality of chlorosilyl groups, e.g., a solution prepared by dissolving 1% by weight of $SiCl_4$, the molecules of which are small and have high activity to hydroxyl groups, in a chloroform solvent. The solution is highly effective for rendering the aluminum plate surface to be uniformly hydrophilic. As a result, a hydrochloric acid removal reaction is brought about owing to the presence of some —OH groups 72 at the aluminum plate surface 71 (FIG. 41), thus forming a siloxane-based monomolecular film. By using $SiCl_4$ as the material containing a plurality of chlorosilyl groups, a hydrochloric acid reaction is brought about on the surface of the aluminum plate 71 owing to hydrophilic —OH groups exposed at the surface. The molecules are secured to the surface via —SiO— bonds such as $Cl_3SiO$— and/or $Cl_2Si(O—)_2$. By subsequently washing the system with a non-aqueous solution, e.g., chloroform, and then with water, unreacted $SiCl_4$ molecules are removed, and a siloxane monomolecular film 73 of $(OH)_3SiO$— and/or $(OH)_2Si(O—)_2$ is obtained on the aluminum plate surface (FIG. 42). The monomolecular film 73 thus formed is perfectly bonded to the aluminum plate by chemical bonds of —SiO— and are difficult to separate. The film surface contains numerous silanol (—SiOH) bonds corresponding in number to about three times the number of initial hydroxyl groups. As an example, the aluminum plate thus obtained, provided with the monomolecular film with numerous —SiOH bonds at the surface, was dipped and held for about one hour in an aqueous solution containing a material containing a carbon fluoride group and a chlorosilane group, e.g., a solution prepared by dissolving about 1% of

in a solution containing 80% of n-hexadecane, 12 % of carbon tetrachloride and 8% of chloroform. As a result, bonds of

Figure 43:
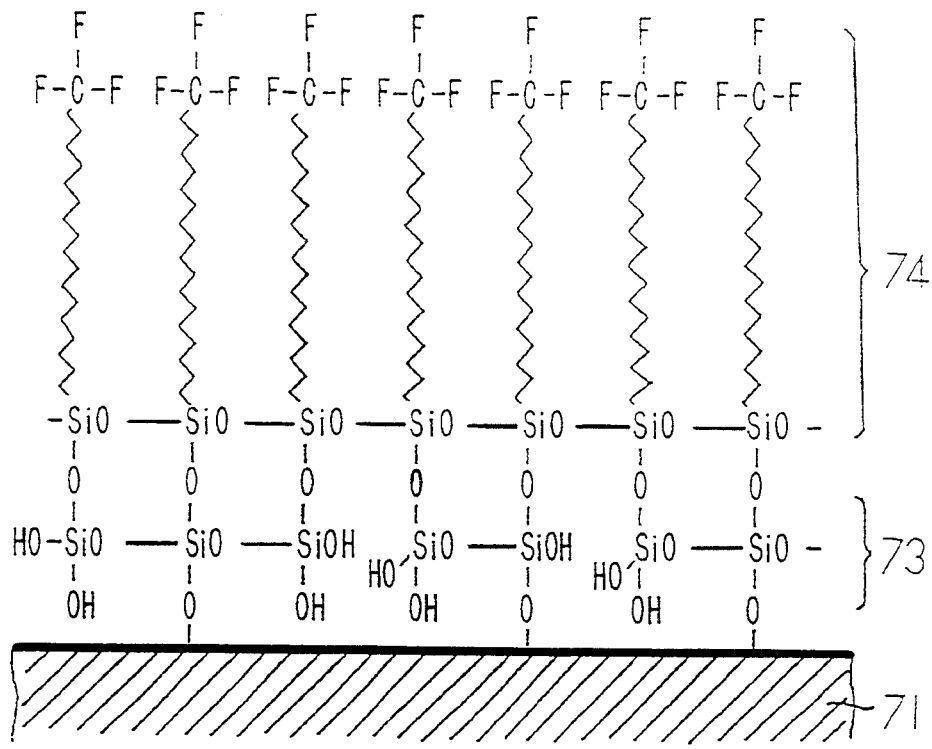
FIG. 43 is a schematic sectional view showing a process of manufacturing a fluorine-based monomolecular film as in example 14 of the invention.

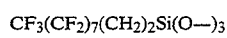

were formed on the aluminum plate surface. A fluorine-containing monomolecular film 74 thus was formed over the entire aluminum plate surface. It was chemically bonded to the inner siloxane monomolecular film and had a thickness of about 1.5 nm (15 angstroms) (FIG. 43). It did not separate in a peel-off test. Its water contact angle was about 155 degrees.

Figure 44:
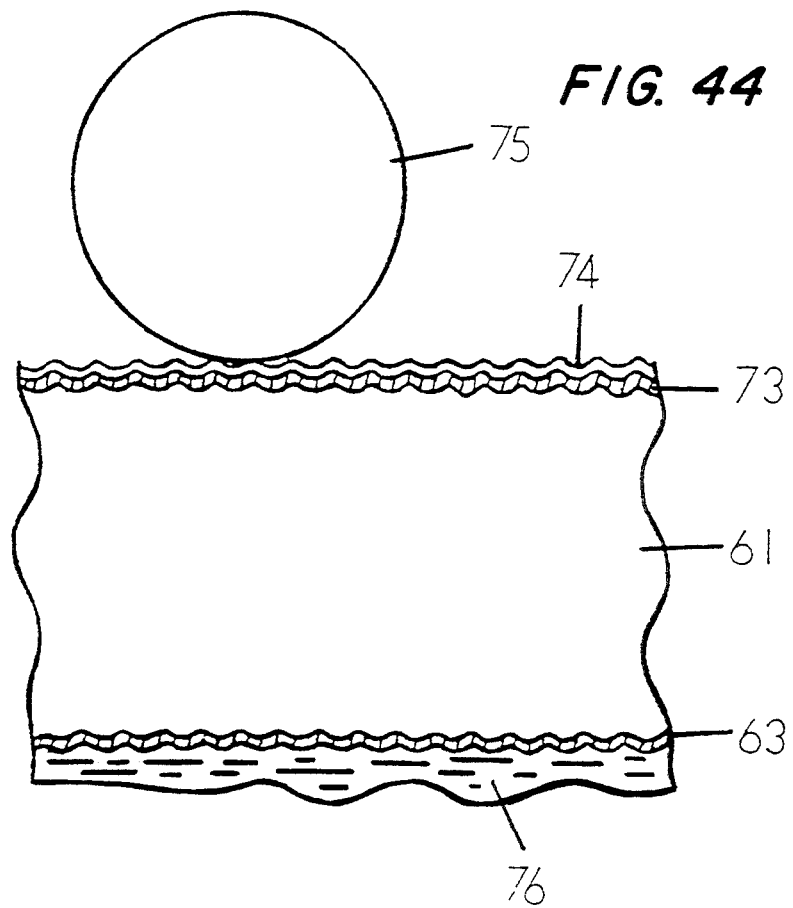
FIG. 44 is a schematic sectional view, to an enlarged scale, showing the surface of a transparent glass plate with a water- and oil-repelling contamination-proof outer surface and an anti-fogging inside surface as in example 14 of the invention.

Meanwhile, using a glass plate in lieu of the aluminum plate in the above example 14, a hydrophilic coating film insoluble to organic solvents and having a thickness of several microns was formed a surface (for instance the inner surface) which was desired to remain hydrophilic for imparting with an anti-fogging effect. For example an aqueous solution of polyvinylalcohol (poval) or pullulan was coated onto the surface, before chemically adsorbing the material containing a carbon fluoride group and a chlorosilane group. After the adsorption, the hydrophilic coating film was removed by water washing, thus obtaining a transparent glass plate, which had a water- and oil-repelling anti-contaminating monomolecular film 74 formed on its outer surface. A monomolecular film (or siloxane film) 73 having hydrophilic hydroxyl groups was formed on its inner surface, as shown in FIG. 44. The anti-fogging effect of this glass plate was checked to find that its surface remained hydrophilic and was readily wetted by water and did not fog. By adsorbing a composition obtained by combining two different surface active materials with different molecular lengths, surface irregularities were obtained at the molecular level, thus further improving the water- and oil-repelling properties and further enhancing the anti-contaminating effects. As shown above, in this example a glass plate or like material is formed with surface irregularities of about 0.1 micron ($\mu$m). The material is dipped in, for example, a fluorine-containing chlorosilane-based surface active agent diluted in an organic solvent. As a result, a hydrochloric acid removal reaction is brought about owing to numerous hydroxyl groups contained at the surface of a natural oxide film formed on the surface of the glass plate or the like. A carbon fluoride-based monomolecular film is thus formed on the substrate surface via siloxane bonds. In this way, surface irregularities less than the visible light wavelength range (400 nm) are formed on the substrate surface, and a carbon fluoride-based monomolecular film with a thickness of a nanometer level is formed on the substrate surface via siloxane bonds, thus obtaining a very highly water- and oil-repelling anti-contaminating film without spoiling the luster of the substrate itself.

EXAMPLE 15

Figure 45A:
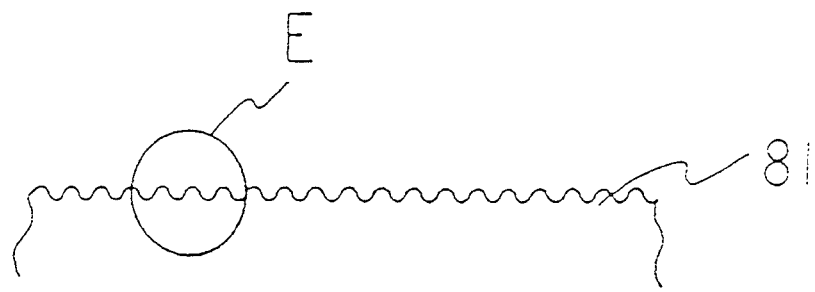
FIG. 45(a) is a schematic sectional view showing a polyethylene tetrachloride film prior to formation of a water- and oil-repelling film as in example 15 of the invention.
Figure 45B:
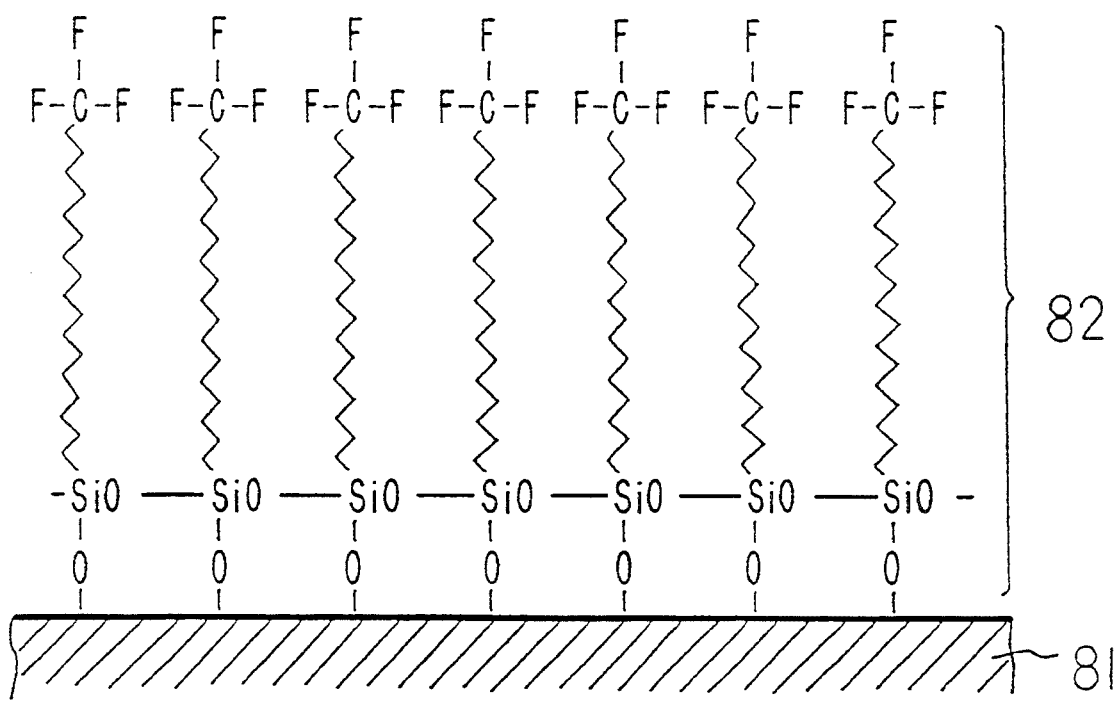
FIG. 45(b) is a schematic sectional view, enlarged to a molecular level, showing a portion E of film surface (a) after formation of the water- and oil-repelling film on the polyethylene tetrachloride as in example 15 of the invention.

As shown in FIG. 45, a polyethylene-trifluorochloride film 81 with a thickness of 100 to 200 microns ($\mu$m) was prepared and held in a vacuum chamber at $10^{-1}$ to $10^{-2}$ Pa. Then, its surface was spatter etched in an oxygen-containing plasma atmosphere by RF glow discharge.

This process was carried out with a discharge power density of 0.15 W/cm$^2$ for 1 to 10 minutes, thus forming surface irregularities of about 0.1 micron. The film did not become opaque (FIG. 45($a$)). Actually, the surface coarseness may be less than 0.3 micron, which is sufficiently small compared to the wavelength of visible light. Under this condition, the film did not become opaque. The etching condition may be appropriately selected. Subsequently, the film with the surface thereof coarsened was dipped and held for one hour in a non-aqueous solution containing a material having a fluorocarbon group and a chlorosilane group. For example an "Aflood" (a fluorine-based solvent by Asahi Glass Co.,Ltd.) solution was prepared by dissolving about 5% of a material represented by the formula:

$$CF_3(CF_2)_7(CH_2)_2SiCl_3$$

As a result, a dehydrochlorination reaction is brought about on the film surface having been etched in an oxygen plasma owing to hydroxyl (—OH) groups formed at the surface, thus producing bonds represented by the formula [3]:

Formula [3]
$$CF_3(CF_2)_7(CH_2)_2SiCl_3 + (-OH) \longrightarrow$$

$$CF_3(CF_2)_7(CH_2)_2\underset{\underset{Cl}{|}}{\overset{\overset{Cl}{|}}{Si}}-O- + HCl$$

on the film surface. The film was then washed with "Aflood" to remove the unreacted material remaining on the surface, followed by washing with water or exposing to air containing moisture. The —SiCl group was changed to a —SiOH group as the formula [4].

Formula [4]
$$CF_3(CF_2)_7(CH_2)_2-\underset{\underset{Cl}{|}}{\overset{\overset{Cl}{|}}{Si}}O- + 2H_2O \longrightarrow$$

$$CF_3(CF_2)_7(CH_2)_2-\underset{\underset{OH}{|}}{\overset{\overset{OH}{|}}{Si}}O- + 2HCl$$

Each silanol group (—SiOH) was then dehydrated and crosslinked to form a siloxane bond (—SiO—) after drying as the formula [5]. Drying temperature may be room temperature or above.

Formula [5]
$$nCF_3(CF_2)_7(CH_2)_2-\underset{\underset{OH}{|}}{\overset{\overset{OH}{|}}{Si}}O- \longrightarrow$$

$$nCF_3(CF_2)_7(CH_2)_2-\underset{\underset{O-}{|}}{\overset{\overset{O-}{|}}{Si}}O- + nH_2O$$

The adsorbed monomolecular film 82 has a fluorine group and is chemically bonded (i.e., covalently bonded) to the substrate 1. The chemical bond is via a siloxane bond. The formation of chemically adsorbed monomolecular film 3 was assumed by FTIR spectrometry and the thickness was about 1.5 nanometers (nm). It is firmly bonded such that it will not separate. A fluorine-contaiing monomolecular film 82 was formed which was chemically bonded to the surface and had surface irregularities at the micron level.

FIG. 45($b$) is an enlarged schematic view showing part E in FIG. 45($a$). In this case, fluorocarbon groups were formed in a regular orientation on the surface, and the surface energy was extremely low. The water contact angle was 135 to 145 degrees.

EXAMPLE 16

A polyethylene terephthalate film 91, for example, was prepared and held in a vacuum chamber at $10^{-1}$ to $10^{-2}$ Pa. Then, the film surface was spatter etched in an oxygen-containing plasma atmosphere based on RF glow discharge, the process was carried out with a discharge power density of 0.1 W/cm$^2$ for 1 to 5 minutes, thus forming surface irregularities. The surface coarseness obtained was about 0.1 micron, and the film did not become opaque. Actually, the film would not become opaque as so long as the surface coarseness is less than 0.3 micron. The etching condition may be appropriately selected. With a film which need not be transparent, it was possible to coarsen the surface to about several tens of microns to obtain sufficient effects.

Figure 46A:
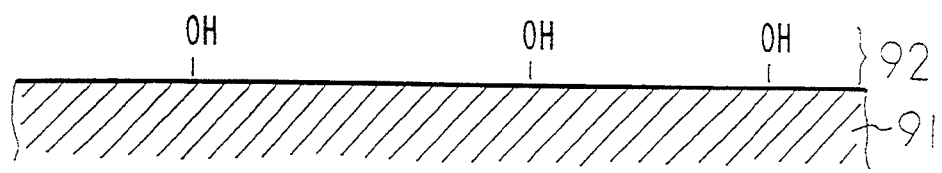
FIG. 46(a) is a schematic sectional, enlarged to a molecular level, showing film surface prior to formation of a water- and oil-repelling film on a poly(ethylene terephthalate) film as in example 16 of the invention.

The film with the surface thereof coarsened was then dipped and held for about one hour in an "Aflood" solution (a fluorine-containing material by Asahi Glass Co., Ltd.) prepared by dissolving about 5% of SiCl$_4$ into the "Aflood". As a result, a dehydrochlorination reaction is brought about on the film surface having been etched by oxygen plasma owing to hydroxyl (—OH) groups 92 contained at the surface, as shown in FIG. 46(a). Thus, molecules represented by formulas 6 and 7

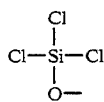  [Formula 6]

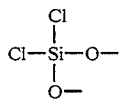  [Formula 7]

are secured to the film surface via —SiO— bonds.

By subsequently washing the system with a non-aqueous solvent, e.g., "Aflood" (a fluorine-based solvent by Asahi Glass Co., Ltd., and then with water, SiCl$_4$ molecules which did not react with the film were removed. A siloxane monomolecular film 93 represented by a formula 8 or formula 9

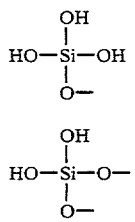

[Formula 8]

Figure 46B:
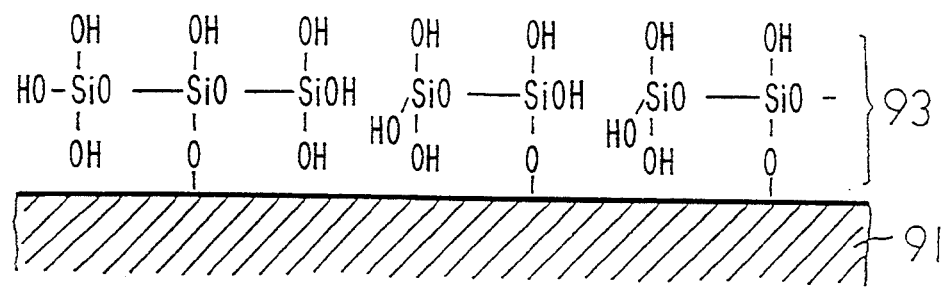
FIG. 46(b) is a schematic sectional view, enlarged to a molecular level, showing a poly(ethylene terephthalate) film surface during formation of the water- and oil-repelling film as in example 16 of the invention.

[Formula 9]

was obtained, as shown in FIG. 46(b). It is chemically bonded.

Figure 46C:
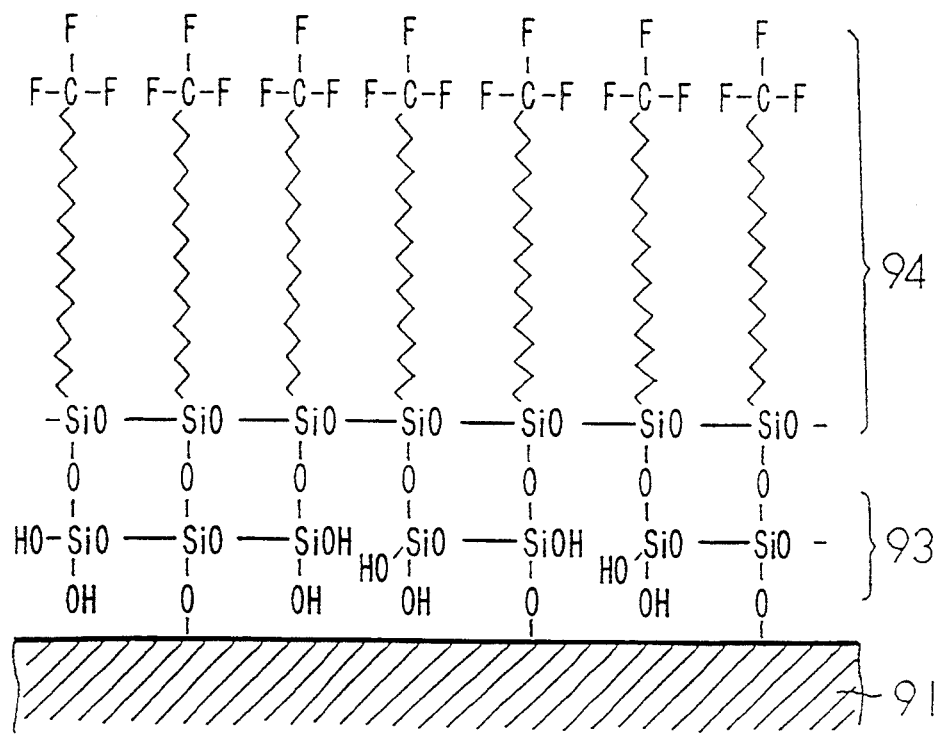
FIG. 46(c) is a schematic sectional view, enlarged to a molecular level, showing the poly(ethylene terephthalate) film surface after formation of the water- and oil-repelling film as in example 16 of the invention.

As an example, the film provided with the monomolecular film as noted above was dipped and held for about one hour in a non-aqueous solution containing a material having a fluorocarbon group and a chlorosilane group, e.g., a solution prepared by dissolving about 3% of a material represented by formula:

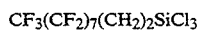

in "Aflood" (a fluorine-containing solvent by Asahi Glass Co., Ltd.). As a result, a dehydrochlorination reaction was brought about owing to numerous hydroxyl (—OH) groups contained at the film surface, thus producing bonds represented by the formula:

on the film surface. A fluorine-containing monomolecular film 94 was formed as shown in FIG. 46(c). The film thus obtained was chemically bonded and had surface irregularities at the micron level. It had high density compared to the film in Example 15.

This monomoecular film will not separate in a checkerboard test. In addition, fluorocarbon groups were oriented on the surface, and the surface energy was extremely low. The water contact angle was 140 to 150 degrees.

Further, using an adhesive, a glass plate was applied to the back surface of the water- and oil-repelling film thus obtained. A very water- and oil-repelling and highly transparent glass plate was obtained. Contaminants did not attach without difficultly, and could be easily removed. Thus, the glass plate was very highly practical.

As in the above example, a chlorosilane-based surface active material containing a chlorosilane ( $SiCl_nX_{3-n}$, n representing 1, 2 or 3, X representing a functional group) group at one end and a straight chain carbon fluoride group at the other end is chemically adsorbed via siloxane bonds to a film surface having been coarsened on the order of sub-microns to microns by means of etching, sand blasting or a mold application process, thus forming a carbon fluoride chemically adsorbed monomolecular film. The film is highly water- and oil-repelling and does not separate. The coarseness of the film surface is on the order of sub-microns to microns, and the thickness of the monomolecular film is at the namometer level. Thus, the film has an excellent light transmission property, does not hinder optical characteristics of the film and is excellent in durability.

By adding or assembling a vinylene group or ethylene group to the alkyl chain portion, the monomolecular film is crosslinked after formation by irradiating it with an electron beam of about 5 Mrads. Thus, hardness is improved.

According to the invention, a very highly water- and oil-repelling carbon fluoride-based chemically adsorbed monomolecular film may be formed on a film surface by a method which comprises a step of coarsening the film surface on the order of sub-microns to microns in advance by means of etching, sand blasting or a mold application process and a step of forming on the film surface a chemically adsorbed monomolecular film by chemically adsorbing a chlorosilane-based surface active material containing a chlorosilane group, $SiCl_nX_{3-n}$, (where n represents 1, 2 or 3, X represents a functional group) at one end and a straight chain carbon fluoride group at the other end.

Further, a fluorine-containing carbon fluoride-based chemically adsorbed monomolecular film having a relatively high molecular adsorption density, can be obtained by a method which comprises, subsequent to the step of coasening the film surface on the order of sub-microns to microns by means of etching, sand blasting a mold application process, a step of contacting the coasened film surface with a non-aqueous solution containing a material containing a plurality of chlorosilyl groups to cause a reaction between hydroxyl groups at the film surface and the chlorosilyl groups of the material containing a plurality of chlorosilyl groups and a step of removing excess material containing a plurality of chlorosilyl groups remaining on the film by washing with a non-aqueous organic solvent and then reacting with water, before the step of forming a monomolecular film of the material containing a plurality of silanol groups and the step of forming an accumulation of the chemically adsorbed monomolecular film by chemically adsorbing a chlorosilane-based surface active material containing a chlorosilane group at one end and a straight chain carbon fluoride group at the other end to the film surface.

The coarseness of the film surface is on the order of sub-microns to microns, preferbly 0.3 microns or less. In this case, an excellent light transmission property is obtained, and light transmission properties of the film in the visible light wavelength range are not hindered. If the coarseness of the film surface is greater than 0.3 microns, the water- and oil-repelling properties are not adversely affected, although optical characteristics are slightly sacrificed. Thus, even in this case, the film can find extensive applications. The surface coarseness is suitable for use in light-blocking films or frost glass.

Further, the film may be readily applied by an adhesive on its back surface to an intended object without adversely affecting optical characteristics. A peel-off sheet may be present on the surface of the adhesive.

The water- and oil-repelling film according to the invention may be applied to glass products such as vehicle windows or font glasses, glass lenses and building windows glasses, ceramic products such as porcelain articles, dishes, vases and water tanks, metal products such as sashes, doors and exterior walls of buildings, furniture, cover films, etc. Examples of the film are fluorine resin-based films of poly(ethylene trifluorochloride), etc., polyester-based films of poly(ethylene terephthalate), etc., polyimide-based films, polyamide-based films of nylon, etc., polyethylene films and polypropyrene films. The water wetting property was like that of lotus leaves, and the water contact angle was about 155 degrees.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed:

1. A method of manufacturing a water- and oil-repelling adsorbed film comprising:
    making a substrate surface irregular wherein the irregularities have a diameter of 0.01–50 μm; and
    contacting said irregular surface with a non-aqueous solution containing an active surface material comprising molecules having a fluorocarbon group and a chlorosilane group or having a fluorocarbon group and an alkoxysilane group.

2. The method of forming a water- and oil-repelling adsorbed film according to claim 1,
    further comprising providing the substrate surface with surface active hydrogen groups before or after the step of making the substrate surface irregular;
    wherein the contact step is carried out by contacting the substrate surface with a silane-based surface active material with the molecules thereof containing a chlorosilane or alkoxysilane group at one end and a fluorocarbon group at the other end to adsorb said surface active material to the substrate surface by a dehydrochlorination reaction or a dealcoholation reaction;
    forming thereon an outer layer more remote from the substrate by reacting the adsorbed surface active material with water with or without previous removal of non-reacted surface active material by washing using a non-aqueous organic solution; and
    drying the substrate surface.

3. The method of forming a water- and oil-repelling adsorbed film according to claim 1, further comprising;
    providing the substrate surface with active hydrogen groups before or after the step of making the surface irregular;
    wherein the contacting step is carried out by contacting the substrate surface with a non-aqueous solution containing a surface active material with the molecules thereof having a plurality of chlorosilyl groups to adsorb said surface active material by a dehydrochlorination reaction;
    reacting the adsorbed surface active material with water with or without previous removal of non-reacted surface active material by washing with a non-aqueous organic solution to form an inner layer;
    contacting the surface of said inner layer with a silane-based surface active material with the molecule thereof containing a silyl group at one end and a fluorocarbon group at the other end to adsorb said surface active material to the substrate surface by a dehydrochlorination reaction or a dealcoholation reaction;
    forming thereon an outer layer more remote from the substrate by reacting with water with or without previous removal of non-reacted surface active material by washing with a non-aqueous organic solution; and
    drying the substrate surface.

4. The method of manufacturing a water- and oil-repelling adsorbed film according to claim 1, wherein said step of making the substrate surface irregular is carried out by:
    mixing fine particles and silicate glass on the substrate surface to form a coating and then thermally baking said coating together with the substrate and then performing a procedure selecting from the group consisting of electrolytic etching, chemical etching, sand blasting, spattering, depositing, and rubbing.

5. The method of manufacturing a water- and oil-repelling adsorbed film according to one of claims 2 and 3, wherein said surface active material is one with the molecules thereof having at one end a chlorosilane group represented by a formula;

$$-SiCl_nX_{3-n}$$

where n represents an integer from 1 to 3, and X represents at least one functional group selected from the group consisting of a lower-alkyl group and a lower-alkoxyl group.

6. The method of manufacturing a water- and oil-repelling adsorbed film according to one of claims 2 and 3, wherein said surface active material is a compound selected from a group consisting of $CF_3-(CF_2)_n-T-SiY_pCl_{3-p}$ where n represents an integer from 1 to 25, T represents a member of the group consisting of an alkylene group, an ethylene group, an acetylene group and a substituted group containing a silicon atom and a hydrogen atom, Y represents a substituted group selected from the group consisting of an alkyl group, a cycloalkyl group, an aryl group and derivatives of these groups, and p represents a number selected from the group consisting of 0, 1 and 2, and $CF_3-(CF_2)_n-T'-SiZ_q(OA)_{3-q}$ where n represents either O or an integer, T' represents a member of the group consisting of an alkylene group, an alkyne group, and a substituted group containing a silicon atom and a hydrogen atom, Z represents a substituted group selected from a group consisting of an alkyl group, a cycloalkyl group, an aryl group and derivatives thereof, A represents a hydrogen atom or an alkyl group, and q represents 0, 1 or 2.

7. The method of manufacturing a water- and oil-repelling adsorbing film according to claim 3, wherein said surface active material with the molecules thereof containing a plurality of chlorosilyl groups is a compound selected from the group consisting of $SiCl_4$, $SiHCl_3$, $SiH_2Cl_2$, and $Cl-(SiCl_2O)_n-SiCl_3$, where n is an integer from 1 to 10.

8. The method of manufacturing a water- and oil-repelling adsorbed film according to claim 1, wherein said substrate is a plastic substrate and the method further comprises contacting the surface thereof with an oxygen-containing plasma atmosphere to be hydrophilic.

9. The method of manufacturing a water- and oil-repelling adsorbed film according to one of claims 2 and 3, wherein said active hydrogen group on the substrate surface is a member of the group consisting of a hydroxyl group, an amino group and an imino group.

10. The method of manufacturing a water- and oil-repelling adsorbed film according to claim 3, wherein said non-aqueous solution containing a surface active material contains a crosslinking agent selected from the group consisting of $SiP_sCl_{4-s}$ where P represents H, a lower-alkyl group and a lower-alkoxyl group, and s represents of 0, 1 and 2, and $SiQ_t(OA)_{4-t}$ where Q is at least one substituted group selected from the group consisting of a lower-alkyl group and a lower-alkoxyl group, A represents hydrogen atom or a lower-alkyl group, and t represents 0, 1 or 2.

11. The method of manufacturing a water- and oil-repelling adsorbed film according to claim 1, wherein the irregularities have a diameter of 0.5–50 μm.

12. The method of manufacturing a water- and oil-repelling adsorbed film according to claim 11, wherein the irregularities have a diameter of 1–10 μm.

13. A method of manufacturing a water- and oil-repelling adsorbed film comprising:
preparing a substrate having active hydrogen groups at the surface and contacting said substrate with a non-aqueous solution containing a material with the molecules thereof having a plurality of chlorosilyl groups to coat said material onto the surface of said substrate through a reaction between active hydrogen groups at said substrate surface and the chlorosilyl groups of said material with the molecules thereof having a plurality of chlorosilyl groups;
coating with a non-aqueous solution containing a mixture of a surface active material with the molecules thereof containing a fluorocarbon group and a chlorosilane group and fine particles having a hydrophilic surface;
contacting with a mixture of a material with the molecules thereof containing a fluorocarbon group and an alkoxysilane group and fine particles having hydrophilic surface; and
thermally baking said coating together with the substrate.

14. A method of manufacturing a water- and oil-repelling adsorbing film comprising:
a step of preparing a substrate having active hydrogen groups at the surface and contacting the surface of said substrate with a non-aqueous solution containing a material with the molecules thereof containing a plurality of chlorosilyl groups to adsorb said material to the substrate surface through a reaction between active hydrogen groups on the substrate surface and chlorosilyl groups of said material with the molecules thereof having a plurality of chlorosilyl groups;
forming a thin film or a chemically adsorbed monomolecular film of said material with the molecules thereof containing a plurality of chlorosilyl groups on said substrate with or without removal of non-reacted material remaining on the substrate by washing with a non-aqueous organic solution;
adsorbing on to the film a non-aqueous solution containing a mixture of a surface active material with the molecules thereof having a fluorocarbon group and a silyl group and fine particles having hydrophilic surface; and
thermally baking said coating together with the substrate.

* * * * *